United States Patent
Kropaczek et al.

(10) Patent No.: US 7,461,038 B2
(45) Date of Patent: Dec. 2, 2008

(54) METHOD AND APPARATUS FOR EVALUATING ROBUSTNESS OF PROPOSED SOLUTION TO CONSTRAINT PROBLEM AND CONSIDERING ROBUSTNESS IN DEVELOPING A CONSTRAINT PROBLEM SOLUTION

(75) Inventors: David Joseph Kropaczek, Wilmington, NC (US); Christian Carlos Oyarzun, Wilmington, NC (US); Steven Barry Sutton, Wilmington, NC (US); Mehdi Asgari, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 11/312,541

(22) Filed: Dec. 21, 2005

(65) Prior Publication Data

US 2007/0179919 A1   Aug. 2, 2007

(51) Int. Cl.
G06E 1/00 (2006.01)
G06E 3/00 (2006.01)
G06F 15/18 (2006.01)
G06G 7/00 (2006.01)

(52) U.S. Cl. .............................. 706/19; 703/6; 703/18; 703/13

(58) Field of Classification Search .................. None
See application file for complete search history.

(56) References Cited

U.S. PATENT DOCUMENTS

| 4,890,242 | A | * | 12/1989 | Sinha et al. ................ 345/419 |
|---|---|---|---|---|
| 5,014,230 | A | * | 5/1991 | Sinha et al. ................ 703/2 |
| 5,452,238 | A | * | 9/1995 | Kramer et al. .............. 703/1 |
| 5,960,200 | A | * | 9/1999 | Eager et al. ................ 717/147 |
| 6,314,473 | B1 | * | 11/2001 | Singer et al. .............. 710/5 |
| 6,345,239 | B1 | * | 2/2002 | Bowman-Amuah ........ 703/6 |
| 6,427,132 | B1 | * | 7/2002 | Bowman-Amuah ........ 703/22 |
| 6,497,169 | B1 | * | 12/2002 | Khosla ..................... 89/1.11 |
| 6,505,085 | B1 | * | 1/2003 | Tuttle et al. ............... 700/28 |
| 6,560,658 | B2 | * | 5/2003 | Singer et al. .............. 710/5 |
| 6,577,700 | B1 | * | 6/2003 | Fan et al. .................. 378/4 |
| 6,606,744 | B1 | * | 8/2003 | Mikurak ................... 717/174 |
| 6,611,867 | B1 | * | 8/2003 | Bowman-Amuah ....... 709/224 |

(Continued)

OTHER PUBLICATIONS

A simple algorithm for determining of movement duration in task space without violating joint angle constraints Jin, Y.G.; Choi, J.Y.; Robotics and Automation, 2001. Proceedings 2001 ICRA. IEEE International Conference on vol. 1, 2001 pp. 972-978 vol. 1 Digital Object Identifier 10.1109/ROBOT.2001.932676.*

(Continued)

*Primary Examiner*—Michael B Holmes
(74) *Attorney, Agent, or Firm*—Harness, Dickey & Pierce, PLC

(57) ABSTRACT

In an embodiment of a method of evaluating robustness of a proposed solution to a constraint problem, operational output data for at least first and second modified versions of the proposed solution is generated. The first modified version has at least one control variable of the proposed solution perturbed in a first direction and the second modified version has the at least one control variable of the proposed solution perturbed in a second direction. At least a portion of the generated operation output data is then presented such as on a graphical user interface.

15 Claims, 14 Drawing Sheets

U.S. PATENT DOCUMENTS

| | | | | |
|---|---|---|---|---|
| 6,671,818 | B1* | 12/2003 | Mikurak | 714/4 |
| 6,694,196 | B2* | 2/2004 | Tuttle et al. | 700/28 |
| 6,737,946 | B2* | 5/2004 | Seale et al. | 335/279 |
| 7,124,101 | B1* | 10/2006 | Mikurak | 705/35 |
| 7,130,807 | B1* | 10/2006 | Mikurak | 705/7 |
| 7,200,541 | B2* | 4/2007 | Kropaczek et al. | 703/13 |

OTHER PUBLICATIONS

Association of uplink power control and base station assignment in cellular CDMA systems Nuaymi, L.; Godlewski, P.; Computers and Communications, 2000. Proceedings. ISCC 2000. Fifth IEEE Symposium on Jul. 3-6, 2000 pp. 705-710 Digital Object Identifier 10.1109/ISCC.2000.860723.*

Image compression using variable blocksize vector quantization based on rate-distortion decomposition Ching Yang Wang; Chyuan Huei; Long Wen Chang; Acoustics, Speech, and Signal Processing, 1997. ICASSP-97., 1997 IEEE International Conference on vol. 4, Apr. 21-24, 1997 pp. 2693-2696 vol. 4 Digital Object Identifier 10.1109/ICASSP.1997.595.*

A genetic algorithm for set query optimization in distributed database systems Jiunn-Chin Wang; Jomg-Tzong Horng; Yi-Ming Hsu; Baw-Jhiune Liu; Systems, Man, and Cybernetics, 1996., IEEE International Conference on vol. 3, Oct. 14-17, 1996 pp. 1977-1982 vol. 3 Digital Object Identifier 10.1109/ICSMC.1996.565428.*

Constrained maximum-likelihood detection in CDMA Peng Hui Tan; Rasmussen, L.K.; Lim, T.J.; Communications, IEEE Transactions on vol. 49, Issue 1, Jan. 2001 pp. 142-153 Digital Object Identifier 10.1109/26.898258.*

Trajectroy Generation in Relative Velocity Coordinates Using Mixed Integer Linear Programming with IHDR Guidance Di Zu; Jianda Han; Dalong Tan; Automation Science and Engineering, 2007. CASE 2007. IEEE International Conference on Sep. 22-25, 2007 pp. 1125-1130 Digital Object Identifier 10.1109/COASE.2007.4341722.*

Augmented Lagrange multiplier based fuzzy evolutionary algorithm and application for constrained optimization Yan Guozheng; Wang Hongjie; Ding Guoqing; Lin Liangming; Intelligent Control and Automation, 2002. Proceedings of the 4th World Congress on vol. 3, Jun. 10-14, 2002 pp. 1774-1778 vol. 3 Digital Object Identifier 10.1109/WCICA.2002.1.*

A metaheuristic approach for controller design of multivariable processes Koumboulis, F.N.; Tzamtzi, M.P.; Emerging Technologies & Factory Automation, 2007. ETFA. IEEE Conference on Sep. 25-28, 2007 pp. 1429-1432 Digital Object Identifier 10.1109/EFTA.2007.4416954.*

An Evolutionary Approach to Design WDM Telecommunication Survivable Networks Kavian, Y.S.; Naderi, M.; Engineering of Intelligent Systems, 2006 IEEE International Conference on Apr. 22-23, 2006 pp. 1-6.*

A robust linearly constrained CMA for adaptive blind multiuser detection Elnashar, A.; Elnoubi, S.; Elmikati, H.; Wireless Communications and Networking Conference, 2005 IEEE vol. 1, Mar. 13-17, 2005 pp. 233-238 vol. 1 Digital Object Identifier 10.1109/WCNC.2005.1424505.*

An energy efficient scatternet formation algorithm for Bluetooth-based sensor networks Saginbekov, S.; Korpeoglu, I.; Wireless Sensor Networks, 2005. Proceedings of the Second European Workshop on Jan. 31-Feb. 2, 2005 pp. 207-216 Digital Object Identifier 10.1109/EWSN.2005.1462012.*

Fault-tolerant multipath transportation aided with channel coding and interleaver for wireless sensor networks Qilian Liang; Lingming Wang; Personal, Indoor and Mobile Radio Communications, 2004. PIMRC 2004. 15th IEEE International Symposium on vol. 4, Sep. 5-8, 2004 pp. 2679-2683 vol. 4.*

Multi-criterion filter design via differential evolution method for function minimization Vondras, J.; Martinek, P.; Circuits and Systems for Communications, 2002. Proceedings. ICCSC '02. 1st IEEE International Conference on Jun. 26-28, 2002 pp. 106-109 Digital Object Identifier 10.1109/OCCSC.2002.1029056.*

QoS routing using lower layer information in ad hoc networks Zhong Fan; Personal, Indoor and Mobile Radio Communications, 2004. PIMRC 2004. 15th IEEE International Symposium on vol. 1, Sep. 5-8, 2004 pp. 135-139 vol. 1.*

An evolutionary based optimisation method for nonlinear iterative learning control systems Hatzikos, V.E.; Owens, D.H.; Hatonen, J.; American Control Conference, 2003. Proceedings of the 2003 vol. 4, Jun. 4-6, 2003 pp. 3638-3643 vol. 4 Digital Object Identifier 10.1109/ACC.2003.1244126.*

* cited by examiner

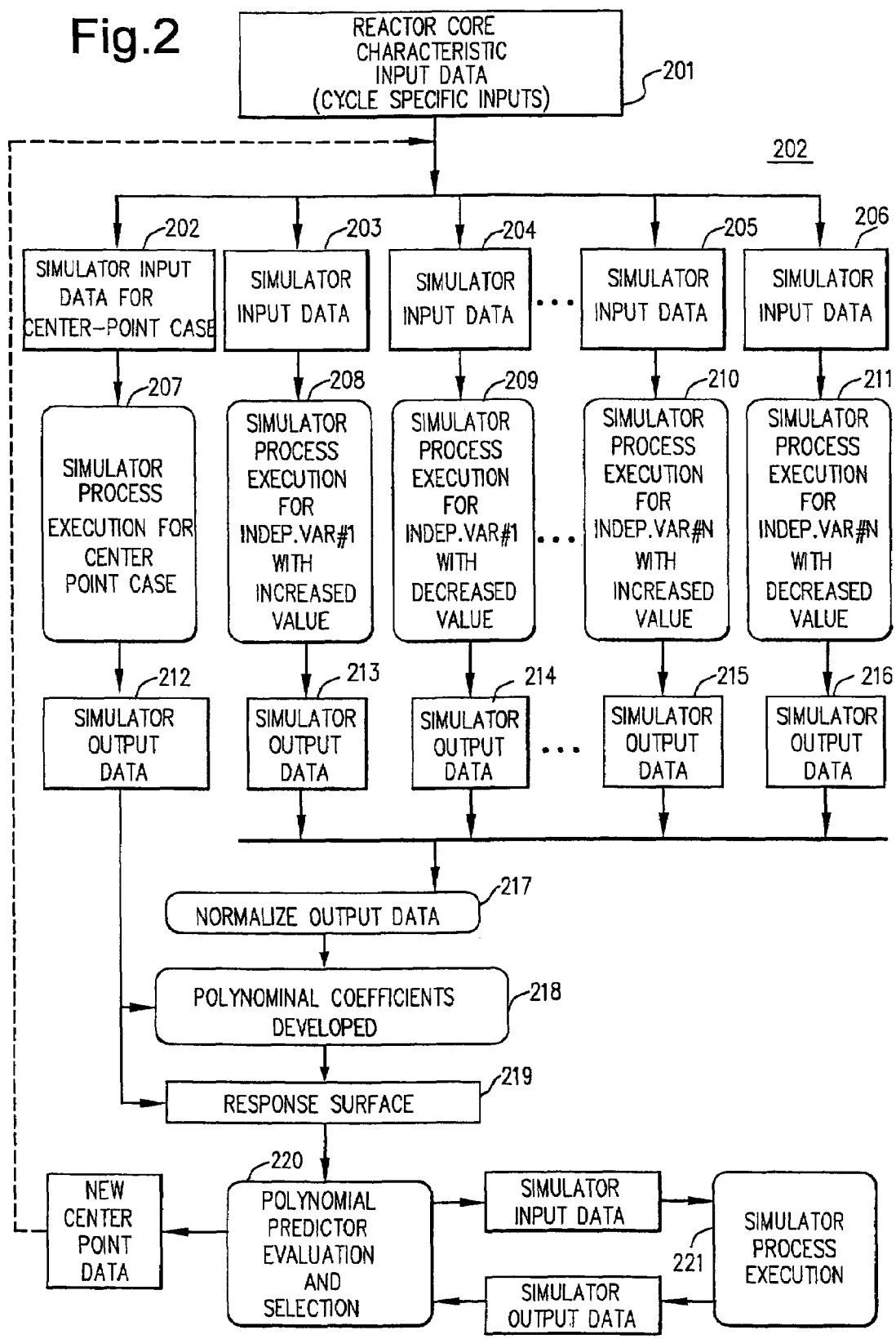

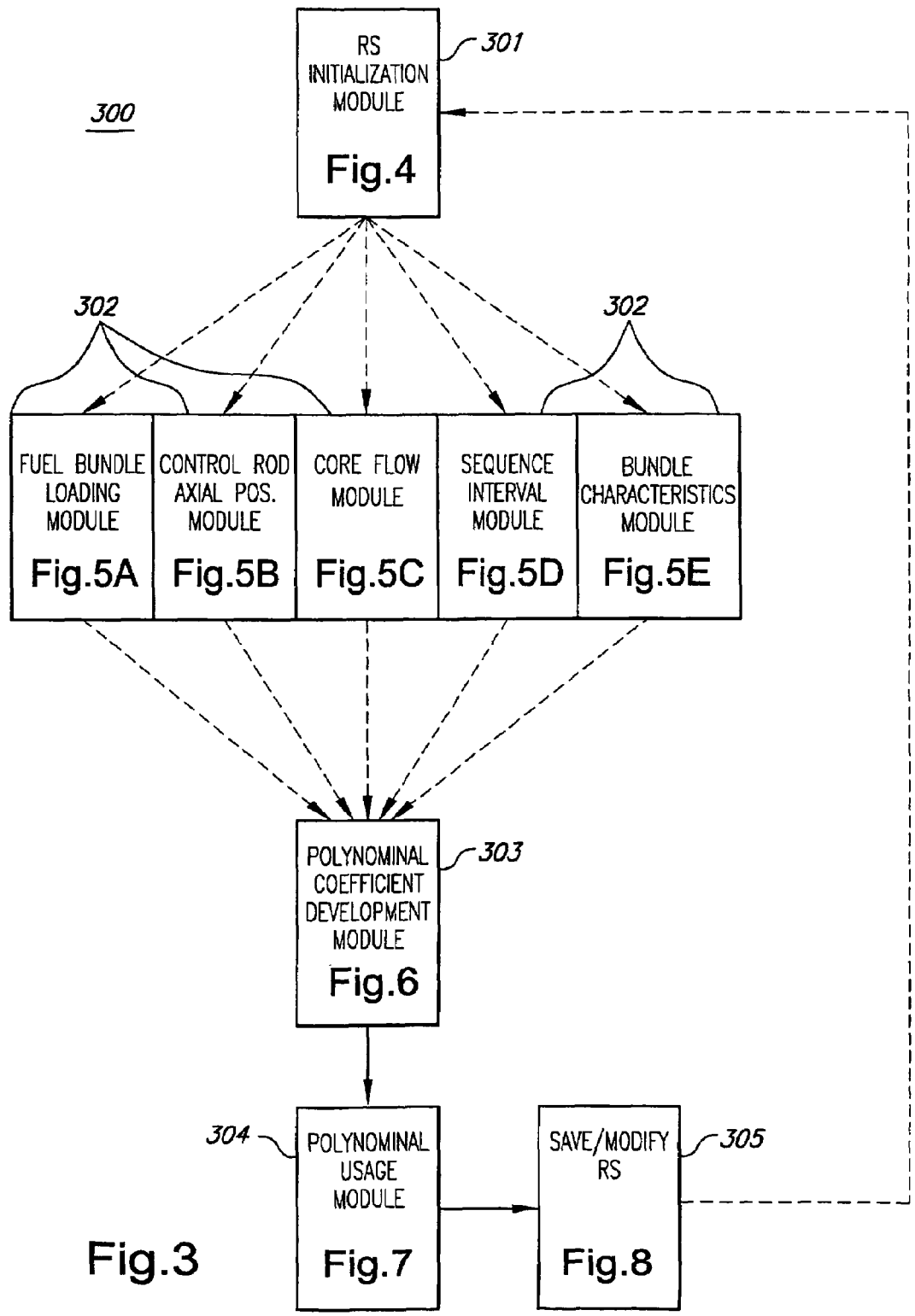

BLADE POSITION INDEPENDENT VARIABLES

| Ivar | Blade Group Name | Exp. | Location | Symm | Ref Pos |
|------|------------------|------|----------|------|---------|
| 25   | A2_G10_INT       | 9    | 15,11    | P    | 0       |
| 26   | A2_G10_INT       | 10   | 15,11    | P    | 8       |
| 27   | A2_G10_INT       | 11   | 15,11    | P    | 10      |

FLOW INDEPENDENT VARIABLES

| Ivar | Exposure | Min   | Max   | Ref.  |
|------|----------|-------|-------|-------|
| 28   | 0.       | 90.20 | 92.66 | 90.20 |

ROBUSTNESS CALCULATIONAL SUMMARY

| Var | Reference | Perturbed | Maprat | i,j,k,exp | Mflpd  | i,j,k,exp   | Mflcpr | i,j,exp   | Dk       | exp |
|-----|-----------|-----------|--------|-----------|--------|-------------|--------|-----------|----------|-----|
| 25  | 0         | 6         | 0.9184 | 13, 7, 4,13 | 0.9223 | 10, 9, 4, 2 | 0.9345 | 12,11,27 | 0.00116  | 24  |
| 25  | 0         | 10        | 0.9184 | 13, 7, 4,13 | 0.9223 | 10, 9, 4, 2 | 0.9337 | 12,11,27 | 0.00254  | 24  |
| 26  | 8         | 6         | 0.9184 | 13, 7, 4,13 | 0.9223 | 10, 9, 4, 2 | 0.9352 | 12,11,27 | -.00070  | 25  |
| 26  | 8         | 12        | 0.9184 | 13, 7, 4,13 | 0.9223 | 10, 9, 4, 2 | 0.9346 | 12,11,27 | 0.00133  | 25  |
| 27  | 10        | 6         | 0.9184 | 13, 7, 4,13 | 0.9699 | 15,11,19,26 | 0.9359 | 12,11,27 | -.00136  | 26  |
| 27  | 10        | 14        | 0.9184 | 13, 7, 4,13 | 0.9223 | 10, 9, 4, 2 | 0.9343 | 12,11,27 | 0.00142  | 26  |
| 28  | 90.20     | 91.43     | 0.9184 | 13, 7, 4,13 | 0.9223 | 10, 9, 4, 2 | 0.9350 | 12,11,27 | 0.00030  | 1   |
| 28  | 90.20     | 92.25     | 0.9176 | 13, 7, 4,13 | 0.9223 | 10, 9, 4, 2 | 0.9350 | 12,11,27 | 0.00050  | 1   |

FIG. 14A

Histogram of Delta MFLCPR, with Normal Curve

METHOD AND APPARATUS FOR EVALUATING ROBUSTNESS OF PROPOSED SOLUTION TO CONSTRAINT PROBLEM AND CONSIDERING ROBUSTNESS IN DEVELOPING A CONSTRAINT PROBLEM SOLUTION

BACKGROUND OF THE INVENTION

Most problems encountered in engineering design are non-linear by nature and involve the determination of system parameters that satisfy certain goals for the problem being solved. Such problems can be cast in the form of a mathematical optimization problem where a solution is desired that minimizes a system function or parameter subject to limitations or constraints on the system. Both the system function and constraints are comprised of system inputs (control variables) and system outputs, which may be either discrete or continuous. Furthermore, constraints may be equalities or inequalities. The solution to a given optimization problem has either or both of the following characteristics: 1) minimizes or maximizes a desired condition or conditions, thus satisfying the optimality condition and 2) satisfies the set of constraint equations imposed on the system.

With the above definitions, several categories of optimization problems may be defined. A Free Optimization Problem (FOP) is one for which no constraints exist. A Constraint Optimization Problem (COP) includes both constraints and a minimize (or maximize) condition(s) requirement. In contrast, a Constraint Satisfaction Problem (CSP) contains only constraints. Solving a CSP means finding one feasible solution within the search space that satisfies the constraint conditions. Solving a COP means finding a solution that is both feasible and optimal in the sense that a minimum (or maximum) value for the desired condition(s) is realized.

The solution to such a problem typically involves a mathematical search algorithm, whereby successively improved solutions are obtained over the course of a number of algorithm iterations. Each iteration, which can be thought of as a proposed solution, hopefully results in improvement of an objective function. An objective function is a mathematical expression having parameter values of a proposed solution as inputs. The objective function produces a figure of merit for the proposed solution. Comparison of objective function values provides a measure as to the relative strength of one solution versus another. Numerous search algorithms exist and differ in the manner by which the control variables for a particular problem are modified, whether a population of solutions or a single solution is tracked during the improvement process, and the assessment of convergence. However, these search algorithms rely on the results of an objective function in deciding a path of convergence. Examples of optimization algorithms include Genetic Algorithms, Simulated Annealing, and Tabu Search.

Within optimization algorithms, the issue of handling constraints for COPs and CSPs must be addressed. Several classes of methods exist for dealing with constraints. The most widespread method is the use of the penalty approach for modifying the objective function, which has the effect of converting a COP or CSP into a FOP. In this method, a penalty function, representing violations in the set of constraint equations, is added to an objective function characterizing the desired optimal condition. When the penalty function is positive, the solution is infeasible. When the penalty function is zero, all constraints are satisfied. Minimizing the modified objective function thus seeks not only optimality but also satisfaction of the constraints.

For a given optimization search, the penalty approach broadens the search space by allowing examination of both feasible and infeasible solutions in an unbiased manner. Broadening the search space during an optimization search often allows local minima to be circumnavigated more readily, thus making for a more effective optimization algorithm. In contrast, alternate methods for handling constraints, such as infeasible solution 'repair' and 'behavioral memory', are based on maintaining or forcing feasibility among solutions that are examined during the optimization search.

To implement the penalty approach, a mathematical expression is defined for each constraint that quantifies the magnitude of the constraint violation. For the given constraint, a weighting factor then multiplies the result to create an objective function penalty component. Summing all penalty components yields the total penalty. The larger the weighting factor for a given constraint, the greater the emphasis the optimization search will place on resolving violations in the constraint during the optimization search. Many approaches exist for defining the form of the penalty function and the weighting factors. As defined by the resultant modified objective function, weighting factors are problem specific and are bounded by zero (the constraint is not active) and infinity (the search space omits all violations of the constraint).

The simplest penalty function form is the 'death penalty', which sets the value of the weighting factor for each constraint to infinity. With a death penalty the search algorithm will immediately reject any violation of a constraint, which is equivalent to rejecting all infeasible solutions. Static penalties apply a finite penalty value to each constraint defined. A static weighting factor maintains its initial input value throughout the optimization search. Dynamic penalties adjust the initial input value during the course of the optimization search according to a mathematical expression that determines the amount and frequency of the weight change. The form of the penalty functions in a dynamic penalty scheme contains, in addition to the initial static penalty weighting factors (required to start the search), additional parameters that must be input as part of the optimization algorithm.

Similar to dynamic penalties, adaptive penalties adjust weight values over the course of an optimization search. In contrast, the amount and frequency of the weight change is determined by the progress of the optimization search in finding improved solutions. Several approaches for implementing adaptive penalty functions have been proposed. Bean and Hadj-Alouane created the method of Adaptive Penalties (AP), which was implemented in the context of a Genetic Algorithm. In the AP method, the population of solutions obtained over a preset number of iterations of the optimization search is examined and the weights adjusted depending on whether the population contains only feasible, infeasible, or a mixture of feasible and infeasible solutions. Coit, Smith, and Tate proposed an adaptive penalty method based on estimating a 'Near Feasibility Threshold' (NFT) for each given constraint. Conceptually, the NFT defines a region of infeasible search space just outside of feasibility that the optimization search would then be permitted to explore. Eiben and Hemert developed the Stepwise Adaption of Weights (SAW) method for adapting penalties. In their method, a weighting factor adjustment is made periodically to each constraint that violates in the best solution, thus potentially biasing future solutions away from constraint violations.

Several deficiencies exist in the penalty methods proposed. Death penalties restrict the search space by forcing all candidate solutions generated during the search to satisfy feasibility. In the static weighting factor approach, one must perform parametric studies on a set of test problems that are reflective of the types of optimization applications one would expect to encounter, with the result being a range of acceptable weight values established for each constraint of interest. The user would then select the weight values for a specific set of constraints based on a pre-established range of acceptable values. Particularly for COPs, varying the static weight values for a given problem can often result in a more or less optimal result. Similarly, dynamic penalties require the specification of parameters that must be determined based on empirical data. Fine-tuning of such parameters will often result in a different optimal result.

Penalty adaptation improves over the static and dynamic penalty approaches by attempting to utilize information about the specific problem being solved as the optimization search progresses. In effect, the problem is periodically redefined. A deficiency with the adaptive penalty approach is that the objective function loses all meaning in an absolute sense during the course of an optimization search. In other words, there is no 'memory' that ties the objective function back to the original starting point of the optimization search as exists in a static penalty or dynamic penalty approach.

One known optimization problem involves design of an operation strategy for a nuclear reactor such as a boiling water nuclear reactor. FIG. 15 illustrates a conventional boiler water reactor. As shown, a jet pump 110 supplies water to a reactor vessel 112 housed within a containment vessel 114. The core 116 of the reactor vessel 112 includes a number of fuel bundles such as described in detail below with respect to FIG. 16. The controlled nuclear fission taking place at the fuel bundles in the core 116 generates heat which turns the supplied water to steam. This steam is supplied from the reactor vessel to turbines 118, which power a generator 120. The generator 120 then outputs electrical energy. The steam supplied to the turbines 118 is recycled by condensing the steam back into water at a condenser 122, and supplying the condensed steam back to the jet pump 110.

FIG. 16 illustrates a fuel bundle in the core 116 of the reactor vessel 112. A typical core will contain anywhere from 200 to 900 of these bundles B. As shown in FIG. 16 the bundle B includes an outer channel C surrounding a plurality of fuel rods 100 extending generally parallel to one another between upper and lower tie plates U and L, respectively, and in a generally rectilinear matrix of fuel rods as illustrated in FIG. 17. The rods 100 are maintained laterally spaced from one another by a plurality of spacers S vertically spaced from the other along the length of the fuel rods within the channel C. Referring to FIG. 17, there is illustrated in an array of fuel rods 100, i.e., in this instance, a 10×10 array, surrounded by the fuel channel C. The fuel rods 100 are arranged in orthogonally related rows and also surround one or more water rods, two water rods 130 being illustrated. The fuel bundle B is arranged in one quadrant of a control rod or blade 132 as is conventional. It will be appreciated that a fuel bundle is typically arranged in each of the other quadrants of the control blade 132. Movement of the control blade 132 up between the bundles B controls the amount of reactivity occurring in the bundles B in association with that control blade 132.

A nuclear reactor core includes many individual components that have different characteristics that may affect a strategy for efficient operation of the core. For example, a nuclear reactor core has many, e.g., several hundred, individual fuel assemblies (bundles) that have different characteristics and which must be arranged within the reactor core or "loaded" so that the interaction between fuel bundles satisfies all regulatory and reactor design constraints, including governmental and customer specified constraints. Similarly, other controllable elements and factors that affect the reactivity and overall efficiency of a reactor core must also be taken into consideration if one is to design or develop an effective control strategy for optimizing the performance of a reactor core at a particular reactor plant. Such "operational controls" (also referred to interchangeably herein as "independent control-variables" and "design inputs") include, for example, various physical component configurations and controllable operating conditions that can be individually adjusted or set.

Besides fuel bundle "loading", other sources of control variables include "core flow" or rate of water flow through the core, the "exposure" and the "reactivity" or interaction between fuel bundles within the core due to differences in bundle enrichment, and the "rod pattern" or distribution and axial position of control blades within the core. As such, each of these operational controls constitutes an independent control-variable or design input that has a measurable effect on the overall performance of the reactor core. Due to the vast number of possible different operational values and combinations of values that these independent control-variables can assume, it is a formidable challenge and a very time consuming task, even using known computer-aided methodologies, to attempt to analyze and optimize all the individual influences on core reactivity and performance.

For example, the number of different fuel bundle configurations possible in the reactor core can be in excess of one hundred factorial. Of the many different loading pattern possibilities, only a small percentage of these configurations will satisfy all of the requisite design constraints for a particular reactor plant. In addition, only a small percentage of the configurations that satisfy all the applicable design constraints are economically feasible.

Moreover, in addition to satisfying various design constraints, since a fuel bundle loading arrangement ultimately affects the core cycle energy (i.e., the amount of energy that the reactor core generates before the core needs to be refueled with new fuel elements), a particular loading arrangement needs to be selected that optimizes the core cycle energy.

In order to furnish and maintain the required energy output, the reactor core is periodically refueled with fresh fuel bundles. The duration between one refueling and the next is commonly referred to as a "fuel-cycle" or "core-cycle" of operation and, depending on the particular reactor plant, is on the order of twelve to twenty-four (typically eighteen) months. At the time of refueling, typically one third of the least reactive fuel are removed from the reactor and the remaining fuel bundles are repositioned before fresh fuel bundles are added. Generally, to improve core cycle energy higher reactivity bundles should be positioned at interior core locations. However, such arrangements are not always possible to achieve while still satisfying plant specific design constraints. Since each fuel bundle can be loaded at a variety of different locations relative to other bundles, identifying a core loading arrangement that produces optimum performance of the core for each fuel-cycle presents a complex and computation-intensive optimization problem that can be very time consuming to solve.

During the course of a core-cycle, the excess energy capability of the core, defined as the excess reactivity or "hot excess", is controlled in several ways. One technique employs a burnable reactivity inhibitor, e.g., Gadolinia, incorporated into the fresh fuel. The quantity of initial burnable inhibitor is determined by design constraints and performance characteristics typically set by the utility and by the Nuclear Regulatory Commission (NRC). The burnable inhibitor controls most, but not all, of the excess reactivity. Consequently, "control blades" (also referred to herein as "control rods")—which inhibit reactivity by absorbing nuclear emissions—are also used to control excess reactivity. Typically, a reactor core contains many such control blades which are fit between selected fuel bundles and are axially positionable within the core. These control blades assure safe shut down and provide the primary mechanism for controlling the maximum power peaking factor.

The total number of control blades utilized varies with core size and geometry, and is typically between 50 and 150. The axial position of the control blades (e.g., fully inserted, fully withdrawn, or somewhere in between) is based on the need to control the excess reactivity and to meet other operational constraints, such as the maximum core power peaking factor. For each control blade, there may be, for example, 24, 48 or more possible axial positions or "notches" and 40 "exposure" (i.e., duration of use) steps. Considering symmetry and other requirements that reduce the number of control blades that are available for application at any given time, there are many millions of possible combinations of control blade positions for even the simplest case. Of these possible configurations, only a small fraction satisfies all applicable design and safety constraints, and of these, only a small fraction is economical. Moreover, the axial positioning of control blades also influences the core cycle energy that any given fuel loading pattern can achieve. Since it is desirable to maximize the core-cycle energy in order to minimize nuclear fuel cycle costs, developing an optimum control blade positioning strategy presents another formidable independent control-variable optimization problem that must also be taken into consideration when attempting to optimize fuel-cycle design and management strategies.

Core design and the development of an operation strategy typically involves a constraint optimization problem wherein a best possible solution that maximizes energy output is developed according to various well-known algorithms. For example, a reactor core and operating strategy may be designed to generate a certain amount of energy measured in gigawatt days per metric ton or uranium (GWD/MTU) over a cycle before being replaced with a new core.

As discussed above, developing a solution to such a constraint problem typically involves a mathematical search algorithm, whereby successively improved solutions are obtained over the course of a number of algorithm iterations. Each iteration, which can be thought of as a proposed solution, hopefully results in improvement of an objective function, producing a figure of merit for the proposed solution. Comparison of objective function values provides a measure as to the relative strength of one solution versus another. Numerous search algorithms for core and operational strategy design exist that rely on the results of an objective function in deciding a path of convergence.

At the beginning of cycle (BOC), the core design is put into operation. As is also typical, actual reactor performance often deviates from the performance modeled in generating the core design. Adjustments from the operational model are quite often made in order to maintain performance of the reactor before the end of cycle (EOC). Accordingly, the desire for robustness in a design solution arises from the fact that the assumptions that form the basis of a given design may change once the plant starts operating. Assumptions fall into several categories. First, there are the assumed operational conditions of the plant, which include for example, the power level, flow, and inlet temperature. Second, there are the assumed biases in the simulation model that are based on historical data. As is known, developing a core and/or operational strategy design solution involves running simulations of the reactor using a proposed solution and using outputs from the simulation as inputs to an objective function, which provides a figure of merit for the propose solution. Numerous simulation programs for simulating reactor performance are known in the art. An example of a simulation model bias is the core eigenvalue, which is a measure of core reactivity or neutron balance, at hot and cold conditions as function of cycle exposure (for a critical core the eigenvalue should be 1.00 but typically ranges between 0.99 and 1.01).

Another category of assumption is assumed margins in the simulation model for each of the thermal and reactivity parameters. Design margins are introduced to account for uncertainties in the simulation model and to assure that once the plant starts operating, thermal and reactivity limits are not violated (the so-called operating margin). Examples of thermal parameters are MFLPD, MFLPCR, and MAPRAT. Examples of reactivity parameters are cold shutdown margin and hot excess reactivity. Reactivity limits include cold shutdown margin (CSDM) and hot excess reactivity (HOTX). CSDM is defined as the reactivity margin to the limit for the reactor in a cold state, with all control blades inserted with the exception of the most reactive control blade. CSDM is determined for each time (exposure) state-point during the cycle. HOTX is defined as the core reactivity for the reactor in a hot state, with all control blades removed, for each exposure state-point during the cycle. Thermal limits include MFLPD (Maximum Fraction of Limiting Power Density), MAPRAT (the ratio of MAPLHGR or Maximum Average Planar Linear Heat Generation compared to its limit), and MFLCPR (Maximum Fraction of Limiting Critical Power Ratio). MFLPD is defined as the maximum of the ratio of local rod power or linear heat generation rate (i.e. kiloWatts per unit length) in a given bundle at a given elevation, as compared to the limiting value. MAPLHGR is the maximum average linear heat generation rate (LHGR) over the plane in a given bundle at a given elevation. MAPRAT is simply the ratio of MAPLHGR to the limiting value. LHGR limits protect the fuel against the phenomena of fuel cladding plastic strain, fuel pellet centerline melting, and lift-off, which is bulging of the clad that exceeds the expansion of the pellet due primarily to fission gas build-up. Lift-off degrades the heat transfer from the pellet across the clad to the coolant. MAPRAT limits protect the fuel during the postulated loss of coolant accident while MFLPD limits protect the fuel during normal operation. MFLCPR protects the fuel against the phenomena of 'film dryout'. In BWR (boiling water reactor) heat transfer, a thin film of water on the surface of the fuel rod assures adequate removal of the heat generated in the fuel rod as water is converted into steam. This mechanism, also known as nucleate boiling, will continue as the power in the fuel rod is increased up until a point known as transition boiling. During transition boiling, heat transfer degrades rapidly leading to the elimination of the thin film and ultimately film dryout, at which time the cladding surface temperature increases rapidly leading to cladding failure. The Critical Power of the bundle is the power at which a given fuel bundle achieves film dryout, and is determined from experimental tests. The Critical Power Ratio (CPR) is the ratio of the critical power to the actual bundle power. MFLCPR is simply the maximum over all bundles of the fraction of each bundles CPR to the limiting value.

Operating margins may be communicated to a core monitoring system, and are derived from plant measurement or instrumentation system. In a BWR, the instrumentation system is comprised of fixed detectors and removable detectors. The removable detectors, or TIPS (traversing in-core probes), are inserted each month to calibrate the fixed detectors. This is due to the fact that the fixed detectors will 'burn out' due to the neutron environment and so must have their signals adjusted. As will be appreciated, however, in a simulator the measurements are simulated. A loss of operating margin may require adjustment of the control blade pattern and/or core flow in order to redistribute the power. The control blade pattern is the amount by which each of the control blades is inserted into the core and how these positions are planned to change over time. Core flow is the flow of water through the core.

Changes in any of the design assumptions—operational conditions, model biases, or margins—may require changes in the reactor control parameters, once the plant begins operation. Avoidance of abrupt changes in core output response (e.g. local power) due to a required change in one of the control variables (e.g. control blade notch) is important from the perspective of plant safety as well as ease of operation.

Core design is currently performed using a fixed set of assumptions. This method of design does not provide information as to the robustness of a given solution. A design may satisfy all design margins for the input set of assumption but may prove to have reduced margins (or worse, approach violations in thermal or reactivity limits) during plant operation. In such instances, the reactor operators would modify the operational strategy (control blade placements and core flow) to recover the lost margin. Typically, such modifications to the operational strategy would be first simulated using the on-line predictive capabilities of the core monitoring system, beginning with a 'snapshot' of the plant state based on the plant measurement and operating conditions. During the simulation of these various scenarios, the degree of robustness of the current solution will become evident. A solution that is brittle may require additional operational maneuvering (such as use of an alternate set of control blades) in order to achieve a robust solution. This maneuvering may require a reduction in core power (and lost electrical generation) during the 'transition' maneuver to the new core state.

An alternative method is to perform a simulation of the base design with a single change in one of the design parameters and validate that a success path, involving a change in operational strategy, exists for satisfying the thermal and reactivity limits. For example, one could change the target hot eigenvalue from 1.0 to 1.003 over the cycle and manually perturb control blades and core flow within the simulation to satisfy thermal and reactivity limits. If no such success path existed, it would be necessary to change the overall design. Examples of such changes would be to perform fuel shuffles, utilize a different set of control blades (e.g. an A1 sequence vs. an A2 sequence), or modify the fresh bundle design. This process is extremely time consuming and can only examine singular changes in the design parameters.

SUMMARY OF THE INVENTION

In an embodiment of a method of evaluating robustness of a proposed solution to a constraint problem, operational output data for at least first and second modified versions of the proposed solution is generated. The first modified version has at least one control variable of the proposed solution perturbed in a first direction and the second modified version has the at least one control variable of the proposed solution perturbed in a second direction. At least a portion of the generated operation output data is then presented such as on a graphical user interface.

Another embodiment, involves configuring an objective function. In this embodiment, an objective function is configured to include at least one term accounting for robustness.

In yet another embodiment, a proposed solution is evaluated using the configured objective function. For example, input variable values for the objective function may be received, and then a figure of merit for the proposed solution may be generated based on the configured objective function and the received input variable values.

A further embodiment of the invention provides a method for operating a system. In this embodiment, a solution derived using an objective function that includes at least one term accounting for robustness is implemented.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein:

FIG. 2 is a data flow diagram illustrating the basic data flow between processes in an example embodiment of a software system for implementing the reactor core multiple control-variable optimization;

FIG. 3 is a block diagram illustrating an example embodiment of a software system for implementing the reactor core multiple control-variable optimization method;

FIG. 4 is a flowchart illustrating exemplary functional program control steps performed by a response surface initialization module;

FIG. 5A is a flowchart illustrating functional program control steps performed by a fuel bundle loading module;

FIG. 5B is a flowchart illustrating exemplary functional program control steps performed by a control rod axial positioning module;

FIG. 5C is a flowchart illustrating exemplary functional program control steps performed by a core flow module;

FIG. 5D is a flowchart illustrating exemplary functional program control steps performed by a sequence interval module;

FIG. 5E is a flowchart illustrating exemplary functional program control steps performed by an fuel bundle characteristics module;

FIG. 6 is a flowchart illustrating exemplary functional program control steps performed by an polynomial coefficient development module;

FIG. 7 is a flowchart illustrating exemplary functional program control steps performed by an polynomial usage module;

FIG. 8 is a flowchart illustrating exemplary functional program control steps for saving and modifying response surface results;

FIG. 14A illustrates an example of the output edits from a robustness calculation according to an embodiment of the present invention;

DETAILED DESCRIPTION OF EXAMPLE EMBODIMENTS

The present invention uses a response surface as a type of cyber-workspace, and allows for real-time predicted reactor simulations. A response surface defines the relationships between a number of design inputs and an number of operation outputs for one or more aspects of reactor core design. Accordingly, prior to describing the present invention, a detailed description of creating the response surface is provided in the context of a method of optimizing a reactor core design using the response surface. Subsequently, the method for predicted reactor core simulation will be provided.

Creating a Response Surface

The following description is directed toward an exemplary embodiment for creating a response surface. The methodology for creating the response surface may be operative as an end-user application running, for example, under the Microsoft Windows 95/NT environment. However, creation of the response surface is not limited to any particular computer system or any particular environment. Instead, those skilled in the art will find that the system and methods presented herein may be advantageously applied to environments requiring management and/or optimization of any multiple control-variable critical industrial/scientific process or system, including chemical and mechanical process simulation systems, pressurized water reactor simulation systems, boiling water reactor simulation systems, and the like. Moreover, the system may be embodied on a variety of different platforms, including UNIX, LINUX, Macintosh, Next Step, Open VMS, and the like. Therefore, the description of the exemplary embodiments which follows is for purposes of illustration and not limitation.

Figure 1A:
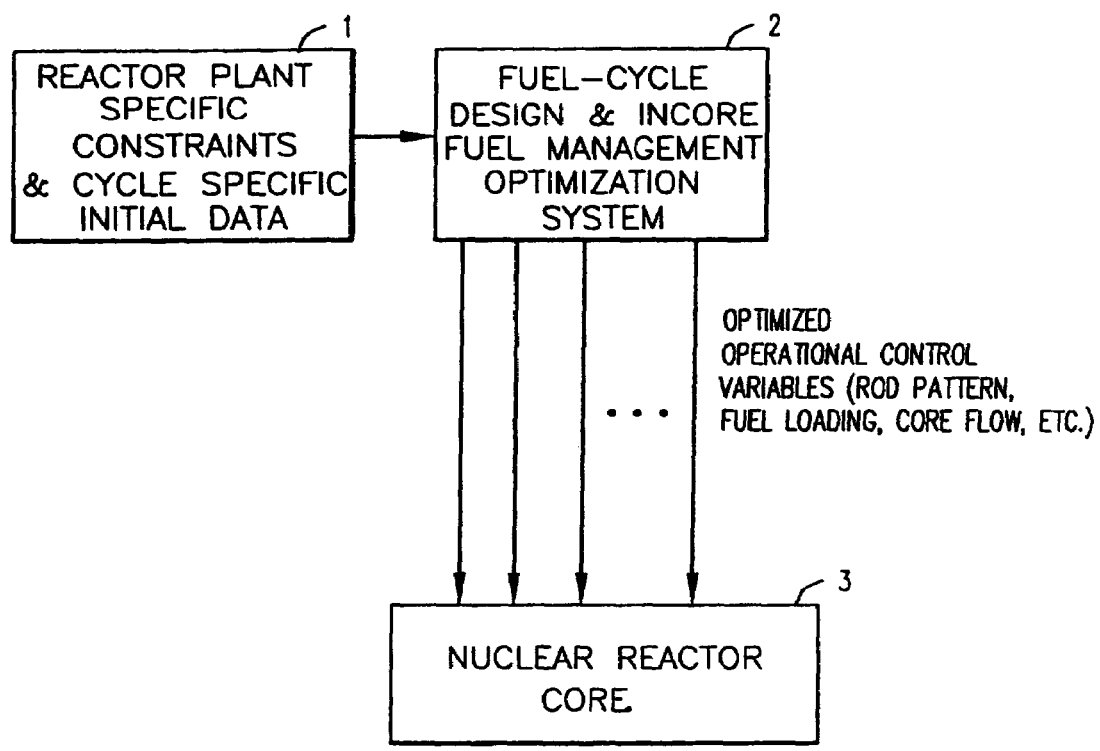
FIG. 1A is a block diagram illustrating a system for the optimization of multiple operational control-variables for a nuclear reactor.

Referring first to FIG. 1A, a block diagram illustrates an example system embodiment for optimization of multiple operational control-variables or design inputs for a nuclear reactor. Reactor plant specific design constraints and cycle specific initial data, 1, defining a particular reactor core, 3, are provided as input data to the optimization system 2. Optimized values for operational control variables or design inputs (e.g., rod pattern, fuel loading, core flow, etc.) are provided as outputs for use in the design and management of the nuclear reactor core.

Figure 1B:
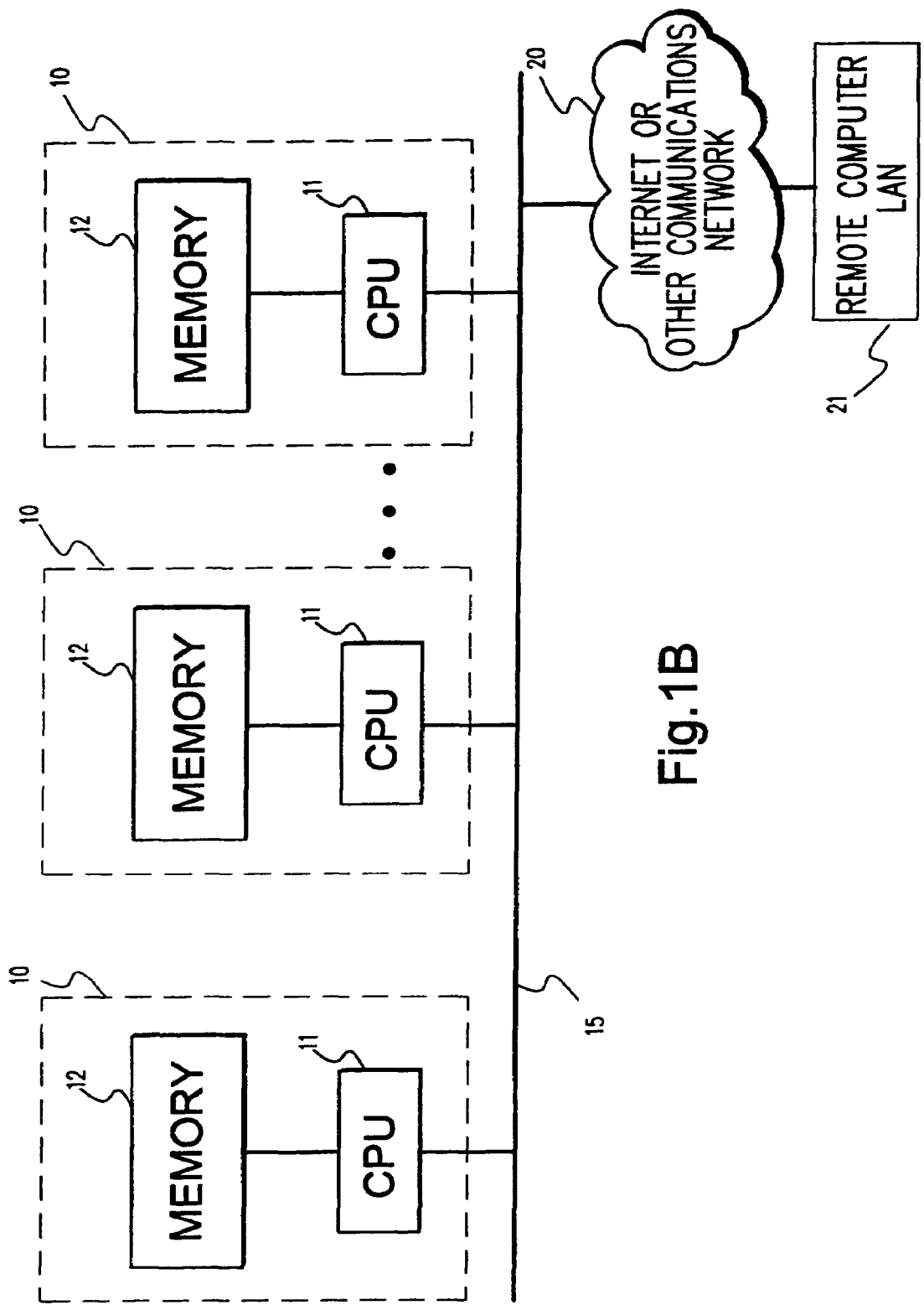
FIG. 1B is a schematic illustration of an example network arrangement of independent processors in which the present invention may be embodied.

Referring to FIG. 1B, an example computer network arrangement is shown on which the optimization method that includes creating a response surface may be embodied. A plurality of general purpose computers/processors 10/11 are coupled to a local area communications network (LAN) 15, which may itself be coupled to one or more distinct open or private access network(s) 20 for communications with one or more remote computers 21. In a preferred embodiment, the multiple control-variable optimization method is implemented via software modules resident on at least one of computers 10. As explained below, the modules may be distributed among computers 10 or may be resident on one or more of computers 10 (and 21) that communicate via LAN 15 and/or network(s) 20.

As represented in FIG. 1B, communications network 15 and/or 20 can be an open network, such as the Internet, or a private access network, such as a local area network (LAN) or a wide area network (WAN). General purpose computers 10 are coupled directly or via a modem to network 15 and consist of independent processor 11 with or without dedicated memory 12 in addition to conventional I/O and user interface components (not shown). Computers 10 can be any of a variety of high speed processors, for example, a VMS-Alpha computer system, a Legacy computer system, a high-speed work station or a high-speed compatible personal computer (such as a desk-top or laptop system). Communications over the networks 15 and 20 can be accomplished using any preferred combination of conventional and proprietary protocols that facilitates efficient inter-processor communications such as, for example, the TCP/IP protocol.

Two or more of computers 10 (21), preferably systems that are capable of supporting the execution of appropriate software for the simulation of nuclear reactor core operations, are coupled via some communications link(s) such as LAN 15 and/or network 20 for exchanging data files and control information. Most any conventional reactor core simulation program (or suite of programs), such as for example, General Electric's (GE's) "PANACEA" 3-D reactor core simulation program, may be used in conjunction with the present invention. This type of simulator program is capable of processing three dimensional variables defining the core. An input file containing values for selected "independent" reactor control-variables or design inputs (e.g., fuel loading, rod pattern, core flow, etc.) is provided as an input and the simulator program provides an output file comprising values for selected performance parameters or operational outputs. For example, the operational outputs include but are not limited to parameters conventionally used to gauge reactor core performance over the fuel operating cycle, such as critical power ratio (CPR), shutdown margin (SDM), maximum average planar linear heat generation rate (MAPLHGR), maximum fraction of linear power density (MFLPD), Hot excess reactivity, radial and axial power peaking, peak fuel rod and bundle exposure, Uranium utilization as measured by reactor energy output produced (in mega-watt-days) per kilogram of Uranium-235 loaded, etc.

Many of the performance parameters analyzed are both spatially and time dependent, such as, for example, MAPLHGR, MFLPD, and minimum critical power ratio (MCPR). Accordingly, some of these operational outputs may be indicative of the state of the reactor core at a plurality of discrete intervals (i.e., each and every "exposure step") throughout one or more core refueling cycles.

Referring now to FIG. 2, the basic functional processes and data flow within an example software system 202 for implementing the multiple control-variable optimization method, which creates the response surface, are described. Information concerning a selectable "resolution" level (explained in greater detail below), other processing options and the reactor core cycle-specific input data information is preferably input by the user at an initial stage (not shown). A cycle-specific reactor core profile input file 201, containing reactor core characteristics and operational critical-to-quality constraints specific to a particular reactor plant for a particular fuel-cycle, is built from this user-input information. The cycle-specific input data is used to identify initial independent control-variable or design input values that define an initial "center-point" data case for a particular reactor. This center-point data is provided as an input data file 201 to a reactor core simulation program (actual simulation program not shown). A reactor core operation simulation 207 is conducted using the center-point data. For example, a three-dimensional (3-D) analysis core simulation is performed on a selected "host" computer 10. When the simulation process is complete, a center-point case simulation output data file 212 is produced. The center-point case simulation output data from this file is then stored in a multidimensional array within the digital storage memory of the selected "host" computer 10 and is used as the basis for creating a type of response surface 219 for evaluating the reactor performance for different control-variable values.

Next, separate simulations of the same reactor core operating under different physical conditions and constraints represented by predetermined changes in independent control-variable values for selected operational control variables are conducted contemporaneously by the software system. Different simulator input data files 203-206 are created, each reflecting a change in a value for a selected control-variable (i.e., design input), and each input file is submitted to an independent reactor core simulator program or process 208-211 resident on one or more independent computers or processors 10,21 connected via the communications network 15,20. After performing a core simulation based on the values in the received input file, each simulator process returns an output data file 213-216 reflecting the resultant output values of the dependent variables (i.e., operational outputs) of the reactor core. Once all of the reactor core simulations for each of the independent variable cases 208-211 are complete, the data from simulator output files 213-216 is normalized as indicated at block 217, for example, by dividing each data item by output data obtained from the original "center-point" case 212.

After all the simulation case output data is normalized, the normalized data for each independent control-variable case is characterized as a transfer function. For example, the normalized data is mapped to a set of corresponding second-order polynomials reflecting the change in a given simulator output with respect to a change in a given control variable; however, polynomials of higher or lesser orders may be used. In other words, second-order polynomials, each of which is characterized by a set of associated polynomial coefficients, are selected to fit the simulation output data obtained in a few limited number of reactor core simulations. For instance, three simulations are exemplary used for evaluating each independent control-variable: a center-point case and two variation cases; wherein the center-point case quantitative value for the particular control-variable is respectively incremented and decremented. The polynomials are then utilized as "predictors" to predict quantitative values of selected operational outputs (i.e., performance parameters) for each control-variable. Coefficients which uniquely define each polynomial are developed from the normalized simulator output data, as indicated at block 218, using conventional algorithmic techniques for solving second-order polynomials (e.g., curve fitting). This normalized coefficient data is stored in an area of computer memory defined herein as the "response surface", as represented by block 219. Basically, response surface 219 contains the dependent operational output (performance parameter) response or relationship of the reactor to individual or combined changes in values of the design input (control-variables). In this manner, the response surface serves as sort of a cyber-workspace and data-array repository for storing the resultant reactor core simulation output data from different case simulations for multiple independent control-variables.

Next, the polynomials for each control-variable are evaluated 220 applying changes to the values in said control-variables spanning each control-variables permissible range and a best polynomial predictor is selected. As discussed in further detail with respect to the Polynomial Optimization And Evaluation Module and FIG. 7, another simulation process 221 is conducted using control-variable values provided by the selected best polynomial predictor to evaluate the modified values. If an improvement in reactor performance is indicated by the simulation results, the modified control-variables are accepted as an improvement over the initial center-point case. This new combination of independent variables is then re-defined as the new center-point case and the entire control-variable evaluation process is again repeated (as indicated by the dotted line in FIG. 2) until no further significant improvements are realized. As such the response surface is modified and grown through this process. Once it is determined that no further improvements are obtainable, the response surface is refined using a smaller (more limited) range for control-variable values and the above steps are repeated. The optimization process as a whole is considered essentially completed when no further improvements to the control-variables are discernible and no feasible reduction to the range of control-variable values can be made.

In FIG. 3, an overview of an example software system 300 for implementing the multiple control-variable optimization method is illustrated in terms of functionally related sections or "modules" with references to separate accompanying FIGS. 4-8 that show example functional program control steps for each module in greater detail. One or more modules of software system 300, including the software system in its entirety, may be embodied on a computer-readable medium for ease of distribution and installation on one or more processors or networked computer systems. Although sections of functionally related software are described herein in terms of component software modules that may be individually or collectively executed by separate processors, the software system need not necessarily be limited to a modular component implementation. As indicated in FIG. 3, an example embodiment of software system 300 includes a Response Surface Initialization Module 301, one or more Control-Variable Modules 302, a Polynomial Coefficient Development Module 303, a Polynomial Usage Module 304 and a Response Surface Save/modify Module 305. A modular arrangement of the functionally related software within software system 300 enhances the overall flexibility and applicability of the software system to different environments by facilitating the use or omission of different Control Variable Modules (FIGS. 5A-5E) as desired or appropriate for a particular application and, moreover, facilitates the adding of new and different or updated Control-variable Modules.

Response surface initialization module 301 is basically responsible for accepting operator-inputted data describing operating conditions and constraints for a given reactor core (e.g., initial core loading, rod pattern, etc.) and creating a starting point or "center-point" simulation case for normalizing response surface 219. Control-variable modules 302 each contain program control steps for creating simulation case data for specific types of reactor core control-variables such as, for example, fuel bundle loading, control rod position, core flow, sequence change locations, bundle characteristics, etc. For each design input (independent control-variable) type, there may be many operational output (independent variable) cases to consider. Furthermore, for each independent variable case considered by a particular control-variable module there are at least two core simulations run from which response data is obtained. For a control variable whose centerpoint is within the range of its min-max permissible values, one simulation is performed using the centerpoint simulation case values with the independent control-variable value increased by a predetermined amount and another simulation is performed using the center-point simulation case values with the independent control variable value decrease by a predetermined amount. For a control variable whose centerpoint is at either end of its min-max permissible value, two simulations are performed, each successively less if the centerpoint lies at its maximum value or each successively greater if the centerpoint lies at its minimum value within the range. The difference between the increased and decreased simulation input values for a particular control-variable or design input is referred to as the range or "breadth" of the control-variable and, since all simulation case results are stored in the response surface, it is also referred to herein as the "breadth" of the response surface (with respect to that control-variable). Each simulation case result includes the values for all of the operational performance parameters (dependent variables) modeled within the core simulation process. Ultimately, the response surface contains at least three core simulation case results for each independent variable case: the center-point case response and two variation case responses created by the particular control-variable module.

Control-variable modules 302 are preferably executed sequentially using a single computer/processor 10 in the LAN. Additional control-variable modules (not shown here) crafted toward particular reactor plant-specific considerations may also be used. The control-variable modules 302 may be executed in any order and any single one or several control-variable modules may be used (as indicated by the dotted lines in FIG. 3) depending on the various critical-to-quality considerations and degree of improvement to reactor performance that may be desired. Simulator input data files containing control-variable values are created by each control-variable module and submitted to other computers/processors in the LAN (or remote network 21) that have resident core simulator programs. Once a simulation case is completed by a processor, it creates a simulator output data file containing the resultant values and sends the file to the computer maintaining the response surface. Since reactor core simulations are typically very time consuming, this distributed processing arrangement allows many different core simulation cases to proceed more or less contemporaneously, thereby greatly reducing the overall elapsed time expended on core simulations.

Alternatively, different control-variable modules could also be resident on different independent computers connected within a LAN, WAN or via other communications links. For example, in such an embodiment, response surface initialization module 301 residing on one computer would place a request over the LAN for the execution of a particular desired control-variable module to another computer on which that module resides and then would forward the center-point case data from the response surface.

Polynomial coefficient development module 303 contains program control code for mapping the core simulation results for each independent variable case to unique second-order polynomial curves corresponding to each performance parameter (i.e., the operational "dependent" variables). The coefficient values of each polynomial are determined such that each polynomial fits the data from the three simulation cases for its corresponding performance parameter. Polynomial usage module 304 contains program control code for exploring changes to values of each control-variable, as well as changes to combinations of control-variables considered together, and determining which changes produce the greatest impact on core performance. Since running a core simulation is time consuming, the polynomials are used as fast predictors (relative to the 3-D simulator execution) to determine performance parameter values over the input breadth of a control-variable in lieu of running a core simulation. The control-variable(s) having the greatest performance impact are determined by reiteratively comparing predicted performance parameter values using a predetermined objective function. Finally, a Save/modify module 305 contains program control code for saving and documenting the response surface and outputting quantified optimum control-variable operational values or, alternatively, modifying the response surface if it is determined that results can be further improved by reducing the "breadth" of the response surface (explained in greater detail below).

Referring now to FIG. 4, a flow chart illustrates example functional steps performed by response surface initialization module 301. The first few initial steps 401-404 basically acquire and identify information needed to create an initial center-point simulation case. At step 401, cycle specific reactor core operating condition data including initial values for control variables (i.e., initial control rod pattern, initial core loading arrangement, etc.) and an initial response surface breadth is specified via operator-input. At step 402, specific operational constraints, which form the design basis, of a particular reactor plant are identified from the acquired operator-input information—such design basis and constraint information aids in the evaluation of an "objective function", discussed below, that is used to compare the relative quality of alternative solutions. In addition, the computer operator may select an input option, discussed in greater detail below with respect to the Polynomial Optimization And Evaluation Module and FIG. 7, that permits the effects on reactor performance of a change in the operational value of two or more control-variables to be considered in combination.

At step 403, the particular independent control-variables (core loading, rod pattern, core flow, sequence exchange, bundle characteristics, etc.) that are to be considered during the optimization are identified based on the acquired operator-input information. At step 404, the fuel bundles to be used within the core are identified and sorted according to reactivity value. Next, at step 405, a core simulation input data file for producing a center-point simulation case is generated and submitted to a resident (or remote) core simulation program. Once the simulation is finished, the results of the simulation are returned in a simulation output file. At step 406, a multi-dimensional array is created in memory as a simulation "response surface" and data from the simulation output file is stored there as an initial center-point case.

Next, one or more control-variable modules 302 are executed to develop simulation case data for variations in values for specific control-variables. The execution of more than one control-variable module is optional. As will be readily apparent from this disclosure, additional control-variable specific modules (not disclosed herein) may also be included as desired. As previously mentioned, the individual control-variable modules may be executed sequentially by a single processor or run contemporaneously on different computers within the LAN or WAN. As the execution of each control-variable module results in adding more simulation case data to the response surface, the accuracy of the present method and the potential reactor performance optimization achievable is correspondingly enhanced.

Referring to FIG. 5A, the functional steps performed by an example control-variable module for fuel bundle loading are discussed first. The fuel bundle loading module examines changes in reactor performance parameters caused by changes in the fuel bundle position or loading arrangement. Conventionally, most reactor cores are octant-symmetric and, consequently, only bundle arrangements within one octant of the core need to be considered. However, octant symmetry is not a requirement of the process. As indicated at step 501, it is first determined if fuel bundle loading changes are allowed given the pre-identified constraints for the particular reactor. If bundle loading changes are not allowed, program control is passed to another module. If bundle loading changes are allowed, all permissible bundle locations are systematically considered by repeating steps 503 through 507 for each different location, as indicated by block 502.

At step 503, the known reactivity value of the bundle at the selected location is changed to a predetermined higher value. A new core simulation input file is then generated—the input file reflecting the change in fuel bundle reactivity value and a shuffling of the remaining fuel to minimize any reactivity differences relative to the center point. This shuffling of the remaining fuel is readily accomplished by referring to the previously sorted list generated by step 404, whereby bundle rank positions in the sorted list are shifted by one position in a 'cascade' strategy. For example, a location that is changed from reactivity rank 10 in the sorted list to rank 5 will have the effect of changing rank 5 to 6, rank 6 to 7, and so forth up until rank 9 to 10. The core simulation input file is then submitted to an available processor/computer for simulation processing, as indicated at step 504. (Although core simulation input files reflecting a "rodded depletion" are generally intended, non-rodded depletion type simulator input files could also be used with this method.) Without waiting for the results of the submitted core simulation, the bundle reactivity value for the same location is changed, at step 505, to a value lower than the original reactivity. The combined amount of increase and decrease exacted to the value for a particular control-variable, as described herein with respect to the various control-variable modules, is predetermined according to the particular control-variable being considered and defines the range or "breadth" of values for which the control-variable is examined.

Next, at step 506, a new core simulation input file having the changed reactivity value is again generated and submitted to any available processor/computer 10 for processing another simulation. In one operational example, once the simulation cases in steps 504 and 506 are completed, output data parameters from each simulation can be normalized to the center point, fit to polynomials and stored to common response surface 219, for example, by each processor/computer performing the core simulation. If changes in reactivity values for fuel bundles at other locations have not yet been simulated, without necessarily waiting for the core simulations of previous steps to complete, a new bundle location is selected and steps 503-506 are again repeated until all allowable bundle locations have been considered, as indicated at step 507. Ultimately, once all the independent control-variable cases for fuel bundle reactivity variations have been considered, processing may continue under control of another module.

FIG. 5B shows program control steps performed by an example control-variable module for the exploring the different axial positions of the control rods or blades. In a manner similar to the fuel bundle loading module of FIG. 5A, two simulation cases for each control rod are developed and the simulation results are added to the common response surface. At step 509, it is first determined if control rod pattern changes are allowed given the pre-identified constraints for the reactor. If control rod pattern changes are not allowed, program control is passed to another module. If control rod changes are allowed, a predetermined control rod is selected for analysis, as indicated at step 510. Next, at step 511, the initial position value of the selected control rod is increased by a predetermined amount such that the amount of the increase does not violate the physical boundaries of the core or the specified user limits. A new core simulation input file, having only the selected control rod position value changed, is then generated and submitted to an available processor/computer 10 for simulation processing, as indicated at step 512.

At step 513, the control rod position value for the same control rod is changed to a value less than the original position as was done in step 511. Next at step 514, a new core simulation input file having the changed position value is again generated and submitted to an available processor/computer 10 for processing a second simulation case. As indicated at step 515, if changes in position values for other control rods are to be simulated, a new control rod is selected and steps 511-514 are again repeated until all control rods have been considered. As with the fuel bundle loading module, each step in the control rod positioning module may proceed without necessarily waiting for the core simulations of previous steps to complete. Finally, once all the independent control-variable cases for control rod position variations have been considered, processing may continue under control of another module.

FIG. 5C shows program control steps performed by an example control-variable module for developing the response surface from changes in the core flow. In a manner similar to the other independent control-variable modules of FIGS. 5A and 5B, two simulation cases for each core flow control-variable are developed and added to the common response surface. At step 519, it is first determined if core flow changes are allowed given the pre-identified constraints for the reactor. If core flow changes are not allowed, program control is passed to another module. If core flow changes are allowed, a particular core flow variable is selected for analysis, as indicated at step 520. Next, at step 521, the initial center-point case value of the selected core flow variable is increased by a predetermined amount. A new core simulation input file, having only the selected core flow variable value changed, is then generated and submitted to an available processor/computer 10 for simulation processing, as indicated at step 522.

At step 523, the core flow value for the same core flow variable is changed to a value less than the original value similar to step 521. Next at step 524, a new core simulation input file having the changes core flow value is again generated and submitted to an available processor/computer for processing a second simulation case. As indicated at step 525, if changes in core flow values for other core flow variables have not yet been simulated, the next independent core flow variable is selected and steps 521-524 are again repeated until all independent core flow variables have been considered. As with the other control-variable modules discussed above, each step in this module may proceed without necessarily waiting for the core simulations of previous steps to complete. Finally, once all the independent control-variable cases for core flow variables have been considered, processing may continue under control of another module.

FIG. 5D shows program control steps performed by an example control-variable module for developing the response surface from changes in sequence interval. In a manner similar to the other control-variable modules, two simulation cases for each control blade sequence interval occurring during the operational cycle are developed and added to the common response surface 219. At step 529, it is first determined if sequence interval changes are allowed given the pre-identified constraints for the reactor. If changes are not allowed, program control is passed to another module. If changes are allowed, a particular sequence interval is selected for analysis, as indicated at step 530. Next, at step 531, the initial center-point case sequence interval value for the selected sequence interval is increased by a user specified amount. A new core simulation input file, having only the selected sequence interval value changed, is then generated and submitted to an available processor/computer 10 for simulation processing, as indicated at step 532.

At step 533, the sequence interval value for the same control blade sequence interval is changed to a value less than the original value similar to 531. Next at step 534, a new core simulation input file having the changed position value is again generated and submitted to an available processor/computer for processing a second simulation case. As indicated at step 535, if changes in values for other sequence interval variables have not yet been simulated, a new bundle is selected and steps 531-534 are again repeated until all other relevant independent sequence interval variables have been considered. As with the other control-variable modules, each step in this module may proceed without necessarily waiting for the core simulations of previous steps to complete. Finally, once all the independent control-variable cases for the sequence interval variables have been considered, processing may continue under control of another module.

Although the modules depicted in FIGS. 5A through 5D together demonstrate the ability of the optimization method to consider independent control-variables that are capable of having values that are considered as "continuous" in nature, such as, for example, loading parameters, rod pattern parameters, flow parameters, and sequence exchange parameters, etc., the method can also be used to consider changes in "discrete" value control-variables, such as bundle characteristics. An example control-variable (CV) module for considering discrete-value type control-variables is provided using the context of fuel bundle characteristics is illustrated in FIG. 5E.

Referring now to FIG. 5E, example program control steps for developing reactor simulation response data from changes in bundle characteristics are described. Fuel bundle characteristics, in this example, can represent any fuel bundle having differences in fuel rod configurations such as that due to radial and/or axial Uranium 235 enrichment variation and/or radial and/or axial Gadolinium variation. Like the previously discussed modules, core simulator cases are generated and executed for each independent control variable. Upon completion of each fuel bundle characteristics independent control-variable, the dependent variable output information is normalized to the relative center-point. However, instead of mapping the response to polynomials, the response is mapped to linear functions. Once all control variable modules 302 and corresponding simulation cases have finished execution and the simulation results normalized to the relative center-point, then the simulation case data is mapped to either polynomials and/or linear functions and the results are stored in the response surface 219.

FIG. 6 shows example functional program control steps for developing polynomial coefficients for mapping each simulation case to a polynomial that fits the three data values for each independent variable case (i.e., the upper, lower and center-point values). At functional step 601, further processing is delayed until all of the simulation cases are complete and the response surface has been updated. Next, at steps 602 and 603, the response surface is accessed and all the simulation data produced by control variable modules 302 is normalized to the center-point case data. Next, at functional step 604, coefficients are determined for defining a unique second order polynomial that fits the three normalized simulation case values for each independent control-variable. However, since the evaluation of certain control-variables (for example, fuel bundle rod configuration) can only be evaluated as discrete changes, core simulation results for these type of variables are stored in the response surface as discrete first order evaluations and are not mapped to polynomials. Finally, at step 605, the coefficients for each polynomial are saved and further processing continues with the polynomial optimization and evaluation module.

FIG. 7 shows example functional program control steps for polynomial optimization and evaluation module 304. This module examines reactor performance parameter values predicted by each of the second-order polynomials associated with each control-variable to determine which control variable and value produces the most significant improvement in reactor performance. At steps 700 and 701, polynomials developed from each of the control-variable simulation cases are accessed from the response surface, sub-grouped and used to predict quantitative values for performance parameters (e.g., CPR, MFLPD, MAPLHGR, etc.) over the breadth of allowable values for that control-variable. In other words, a control-variable is selected and the polynomials associated with each of the performance parameters (i.e., operational outputs) as influenced by that control-variable are used to predict a set of performance parameter values indicative of reactor performance for each of a predetermined number of discrete incremental changes in the value of the selected control-variable over the breadth (i.e., range of predetermined permissible values) of the control-variable. This process is repeated for every independent control-variable.

Under a principle generally known in the art as "superposition", the net effect of a plurality of changes made to different control-variables together in combination can be determined by the summation of the effects of the individual control-variable changes made separately. Accordingly, at the initialization and input stage (i.e., when cycle specific inputs and design basis considerations are identified, e.g., as discussed above with respect to steps 401 and 402 of the Initialization Module in FIG. 4), a user of the present system may select an optimization "resolution" level as input option that permits changes to quantitative operational values for more than one independent variable to be evaluated in combination with each other. Consequently, if this option was previously selected, then, at step 700, the individual polynomial-predicted effects of every combination of a selected plurality of independent control-variables are summarily combined to quantitatively determine the net effect that a plurality of changes to different control-variables made together would have on each of the many reactor core performance parameters. The higher the selected resolution level, the more independent control-variables are evaluated together in combination and, hence, the greater the probability of detecting a combination that will improve reactor performance. For example, at a selected optimization resolution level of "three", a change in the quantitative values for three different independent control-variables and every combination of three control-variables out of the total number of control-variables considered would be evaluated. All discrete changes among the plurality of control-variables under a particular resolution are examined using the associated polynomial predictors for each control variable.

Although higher resolution levels may require somewhat longer processing times than lower resolution levels, the total processing time is significantly less than conventional methods because the polynomial predictors are used and combined accordingly instead of performing actual computer simulations of the reactor core for each case. In this manner, the method is essentially exhaustive and is almost guaranteed to identify the global optimum fuel-cycle design. While very high resolution levels may not be feasible in practice due to the extended processing time required, the capacity of this method to permit selection of a particular resolution level enables the system user to selectively quantify a degree of "closeness" to the true absolute optimum which is desired to be achieved.

Next, at step 702, for each quantitative value change made to a individual control-variable or combination of control-variables (i.e., the design inputs), an "objective function" test is used to quantify the relative "worth" or "strength" of that change in terms of its effect on improving the performance parameters (i.e., the "dependent" variables). The objective function sets a particular limiting value for each performance parameter that is determined primarily through an integration of performance "violations" relative to defined design limits, offset by the integration of any performance "credits" associated with beneficial results such as additional energy, increased thermal margin, etc. Pre-determined multipliers (i.e., mathematical factors) are applied to design limit values for each of the performance parameters-such as, for example, Hot Excess, MFLPD, MAPLHGR, etc.—to provide normalization and relative ranking of each parameter. Basically, in step 702, each predicted performance parameter value is tested using an objective function, fashioned in accordance with conventional knowledge and practice in the art, to determine the best set of control-variable polynomial predictors for optimizing core performance. At step 703, the best values for the control-variables are identified. Since each polynomial predictor corresponds to a specific control-variable, polynomial predictors are compared, as rated by the objective function of step 702, and reiteration of steps 700-702 continues until the best values for the control-variables have been identified. Next, at step 704, the control-variable values are compared with the values obtained from previous iterations (if any) to determine if any improvement is found to exist (i.e., improvement in the figure of merit provided by the objective function). If no improvement is detected, processing continues with the steps shown in FIG. 8. If some improvement is found to exist, a core simulator input case is prepared using the improved values from the selected best polynomial predictor(s) corresponding to one or more control-variables and a core simulation is executed, as indicated at step 705.

Although the use of polynomials allows for a rapid prediction of what changes may constitute an improvement in reactor performance, the core simulation at step 705 provides calibration between the simulation process and the polynomial coefficient data in the response surface. Essentially, it allows for verifying the predicted improvement by providing "actual" (as opposed to "predicted") core simulation data documenting the operation of the core under the improved control-variables. At step 706, the core simulation results of step 705 are compared with the core simulation results from the center-point case (or the results of previous optimizations) to determine if any improvement to core performance has resulted. If the results from the step 705 core simulation show an improvement over the center-point case, the improvement is incorporated and the process is repeated again, as indicated at step 708. If the results of the core simulation at step 705 have not improved, the corresponding control-variable(s) is considered as "unreliable" and marked as such at step 707. Namely, in step 707 the corresponding control-variable values will not be considered as a potential solution. Once a predetermined number of unreliable control-variables is exceeded, as tested at step 709, polynomial optimization and evaluation ceases and processing continues with the steps shown in FIG. 8.

FIG. 8 shows example functional program control steps for Save/modify Response Surface Module 305. First, the current "breadth" of the response surface is examined at step 801 (i.e., the breadth of the response surface in terms of the range of control-variable values explored). If a reduction in the predetermined range of values used by the CV modules in creating simulation cases for the control-variables is feasible, then that range is decreased and the creation of a new response surface is initiated using the original center-point case data. This is indicated at functional step 802 as reducing the response surface breadth. At this point, the optimization process starts over again creating this "new" response surface using one or more of the various control-variable modules, as indicated by entry point "B" in FIG. 4. If reducing the "breadth" of control-variable values used by the CV modules is not feasible, the current response surface data is documented (saved) and the optimized control-variable values are output, as indicated by steps 803 and 804.

Predicted Reactor Core Simulation

Figure 9:
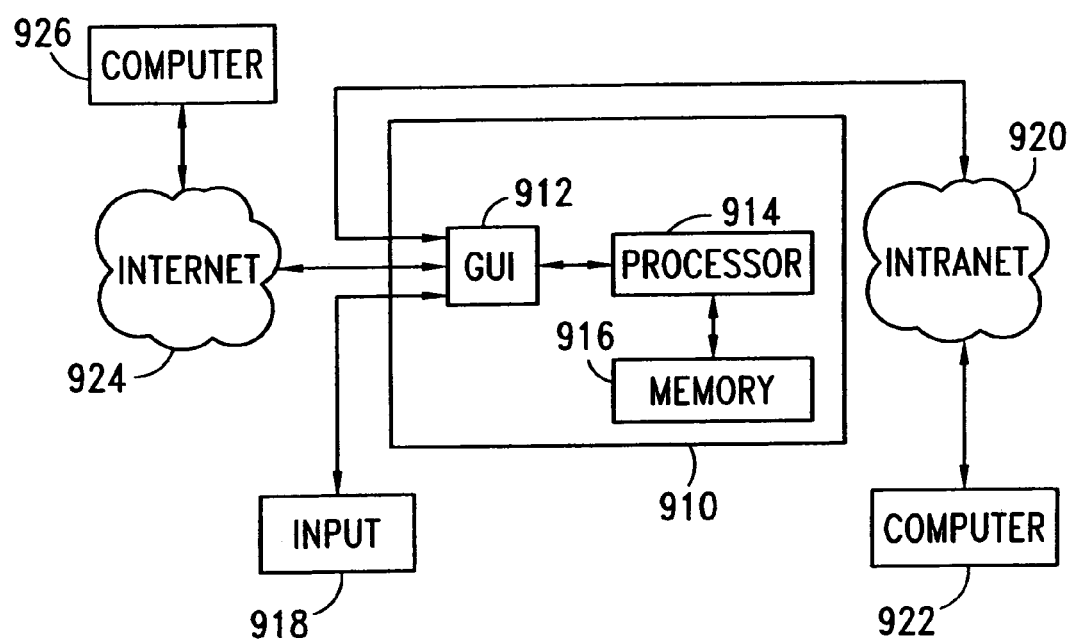
FIG. 9 illustrates a block diagram of an exemplary system employing the method of predicted reactor core simulation according to the present invention.

FIG. 9 illustrates a block diagram of an exemplary system employing the method of predicted reactor core simulation according to the present invention. As shown, a server 910 includes a graphical user interface 912 connected to a processor 914. The processor 914 is connected to a memory 916, which stores one or more response surfaces among other things. The server 910 is directly accessible by a user input device 918 (e.g., a display, keyboard and mouse). The server 910 is also accessible by computers 922 and 926 over an intranet 920 and the Internet 924, respectively.

A system user accesses the system directly, over the intranet 920 or over the internet 924 using one of the input 918, the computer 922 and the computer 926. When the user accesses the system, the processor 914 via the GUI 912 provides the user with the option of using a predicted reactor simulation tool executable by the processor 914. If the user selects to use this tool, the operation shown in FIG. 10 is performed.

Figure 10:
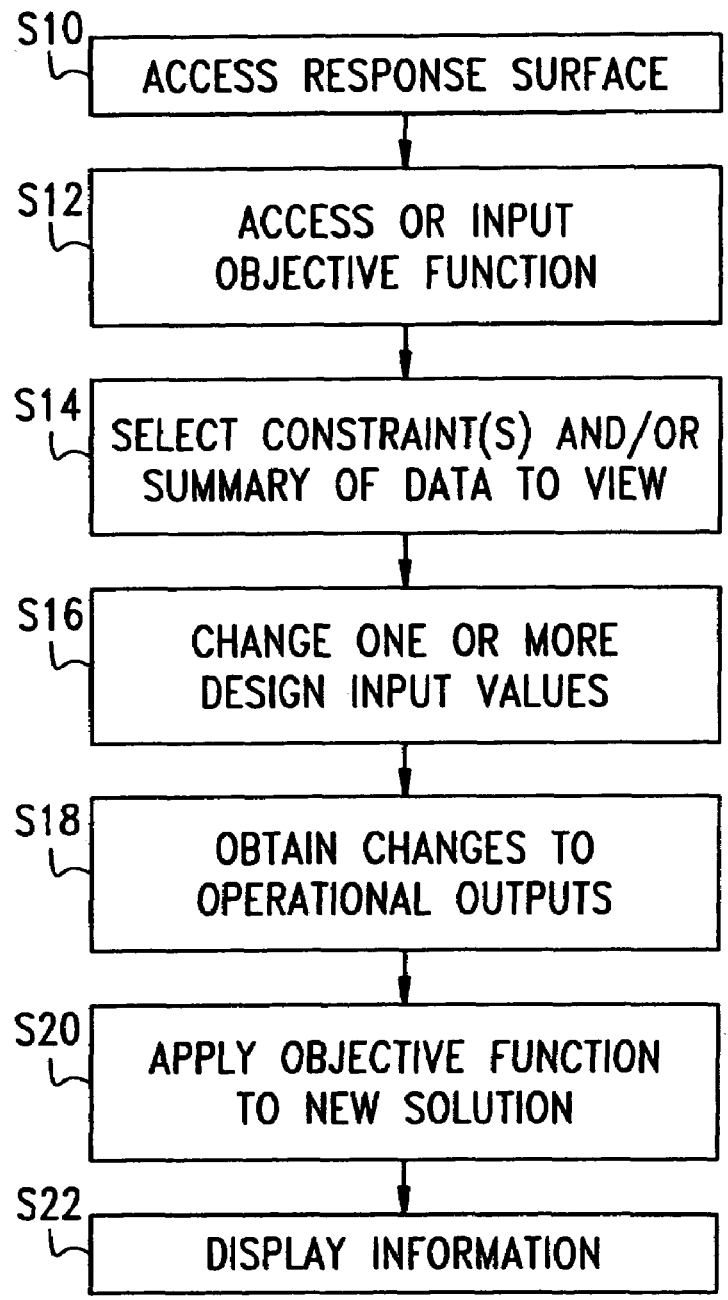
FIG. 10 illustrates a flow chart of the method of predicted reactor core simulation according to an exemplary embodiment of the present invention.

FIG. 10 illustrates a flow chart of the method of predicted reactor core simulation according to an exemplary embodiment of the present invention. As shown, using the predicted reactor simulation tool, the user accesses a response surface stored in the memory 916 and any associated information in step S10. For example, in step S10, the data accessed as part of the response surface may include: 1) the set of independent control variables (i.e. control rods, fuel bundles, exposure steps, etc.) perturbed in the creation of the response surface; 2) the breadth or range over which each independent control variable was perturbed in the creation of the response surface; 3) the center-point solution corresponding to the 'null' perturbation response surface prediction; and 4) the set of response surface polynomial coefficients. As will be appreciated, the memory 916 may store a plurality of response surfaces for one or more reactor cores.

In step S12, the user may also access the objective function, along with the corresponding problem constraints and weights comprising the objective function, used in conjunction with the accessed response surface to generate a core design. In addition or alternatively, the user may input revised problem constraints and weights thus providing a 'new' objective function.

After the user accesses the response surface and optionally, the objective function, in step S14 the user selects one or more design inputs, one or more operational outputs, one or more constraints on the design inputs and/or outputs, and/or a predetermined format of a summary of this information to be displayed. It will be appreciated that the present invention is not limited to these display options and the numerous other display options are possible.

In step S16, the user changes one or more design input values and/or constraints on design inputs. Next, the user requests the processor 914 to generate new operational outputs using the modified design input(s) and/or constraint(s) in step S18. The generation of operational output values using the response surface was discussed in detail above regarding generating the response surface, and is not repeated here. Because the response surface generates the operational output results using the relatively simple polynomials represented by the response surface, the operational output values are generated in real time. This is contrasted with the relatively lengthy process taken by conventional reactor simulators to generate operational output values.

In step S20, the user indicates the objection function to apply to the original solution represented by the selected response surface and the new solution represented by the results of step S18. The user may select to use the objective function used in generating the selected response surface on both the original and new solution. Alternatively, the user may select to use a newly input objective function (see step S12) on both the original and new solution. As a further alternative, the user may specify using one objective function on the original solution and a different objective function on the new solution.

Subsequently in step S22, the user indicates the manner in which to supply the information generated by the predicted reactor simulation. For example, the user may instruct the processor 914 to display a worst case value for one or more operational outputs; display figures of merit (e.g., objective function values) for the original solution and/or new solution based on the selections made in step S20; display the information generated in step S18 and supplied in step S16 in a predetermined format; and/or a combination of the above. All output results from the predicted reactor simulation may be displayed graphically and may include: 1) scalar plots versus time; 2) one-dimensional axial plots versus time; 3) two-dimensional core radial maps versus time; 4) three-dimensional core maps by axial cutting plane versus time; and 5) three-dimensional core view versus time.

As will be appreciated, the method of predicted reactor simulation provides for using the response surface generated for a reactor core as a type of cyber-workspace to test possible changes to the design. Furthermore, the predicted reactor simulation results are generated in real time making this a feasible option for quickly testing theories or just experimenting with design changes.

The Generic Objective Function

The present invention provides a generic definition of an objective function, which is applicable across a wide variety of constraint and optimization problems. Namely, the generic objective function is applicable to any large scale, combinatorial optimization problem in discrete or continuous space such as boiling water reactor core design, pressurized water reactor core design, transportation scheduling, resource allocation, etc. The generic objective function is defined as a sum of credit and penalty components. A penalty component includes a penalty term multiplied by an associated penalty weight. A credit component includes a credit term multiplied by an associated credit weight. The credit terms represent the optimality conditions for the problem. The penalty terms represent the constraints for the problem. Each credit term is a mathematical expression that quantifies an optimality condition. Each penalty term is a mathematical expression that quantifies a constraint. Mathematically, this can be expressed as follows:

$$F_{obj} = \sum_m \lambda_m^{credit} C_m + \sum_n \lambda_n^{penalty} P_n \quad (1)$$

where, $F_{obj}$=objective function
$C_m$=credit term m
$P_n$=penalty term n
$\lambda_m^{credit}$=weight factor credit term m
$\lambda_n^{penalty}$=weight factor penalty term n Credit and penalty terms may be defined by maximum (i.e. upper bounded) or minimum (i.e. lower bounded) values and can represent scalar or multi-dimensional values. The only requirements are: 1) the penalty terms must be positive for constraint violations and zero otherwise, and 2) in the absence of constraint violations, the credit terms are consistent with a minimization problem. Thus, minimizing the modified objective function solves the optimization problem.

As an example, consider an air-conditioning system where the optimization problem is to minimize the average air temperature within a room, yet assure that no region within the room exceeds a certain temperature. For this example, the credit would be the average air temperature within the room volume. The constraint would be a limit on the point-wise temperature distribution within the room, which, in the form of a penalty term, would be calculated as the average temperature violation. To obtain the average temperature violation one would sum the differences of actual and limiting temperature values for those points within the room that violate and divide by the total number of points. Alternatively, one could calculate the penalty term as the maximum value of the point-wise temperature violations within the room. The form of the generic objective function thus allows any number of credit and penalty terms to be defined in a general manner for the problem being solved.

Forms for the credit or penalty terms include, but are not limited to:

The maximum value within a data array;

The minimum value within a data array;

The average of values within a data array;

The integral of values within a data array;

The maximum of calculated differences between elements of a data array and the corresponding constraint limit, restricted to elements that violate;

The minimum of calculated differences between elements of a data array and the corresponding constraint limit, restricted to elements that violate;

The average of calculated differences between elements of a data array and the corresponding constraint limit, restricted to elements that violate; and The integral of calculated differences between elements of a data array and the corresponding constraint limit, restricted to elements that violate.

An objective function as described above may be implemented using the architecture of FIG. 9.

Configuring the Objective Function for an Optimization Problem

According to one embodiment, a configured objective function satisfying the above-described generic definition is already stored in the memory 916 of the server 910. For example, the configured objective function could have been configured according to one of the embodiments described below. In this embodiment, the user instructs the server 910 to provide a list of the configured objective functions stored in the memory 916, and instructs the server 910 to use one of the listed configured objective functions.

In another embodiment, a user via input 918, computer 926 or computer 922 accesses the server 910 over the graphical user interface 912. The user supplies the server 910 with a configured objective function meeting the definition of the above-described generic definition. In this embodiment, the user supplies the configured objective function using any well-known programming language or program for expressing mathematical expressions. Specifically, the user instructs the processor 914 via the graphical user interface 912 to upload a file containing the configured objective function. The processor 914 then uploads the file, and store.

In still another embodiment, configuring the objective function is interactive between the user and the server 910. Here, the user instructs the processor 914 to start the process for configuring an objective function. The processor 914 then requests the user to identify the number of credit components and the number of penalty components. For each credit component, the processor 914 requests that the user provide a mathematical expression for the credit term and an initial weight for the associated credit weight. For each penalty component, the processor 914 requests that the user provide a mathematical expression for the penalty term and an initial weight for the associated penalty weight. In supplying the mathematical expression, the processor 914 via the graphical user interface 12 accepts definitions of mathematical expressions according to any well-known programming language or program.

In another embodiment, the server 910 is preprogrammed for use on a particular constraint or optimization based problem. In this embodiment, the server 910 stores possible optimization parameters and possible constraint parameters associated with the particular optimization or constraint problem. When a user instructs the processor 914 via the graphical user interface 912 to configure an objective function, the processor 914 accesses the possible optimization parameters already stored in the memory 916, and provides the user with the option of selecting one or more of the optimization parameters for optimization.

Figure 11:
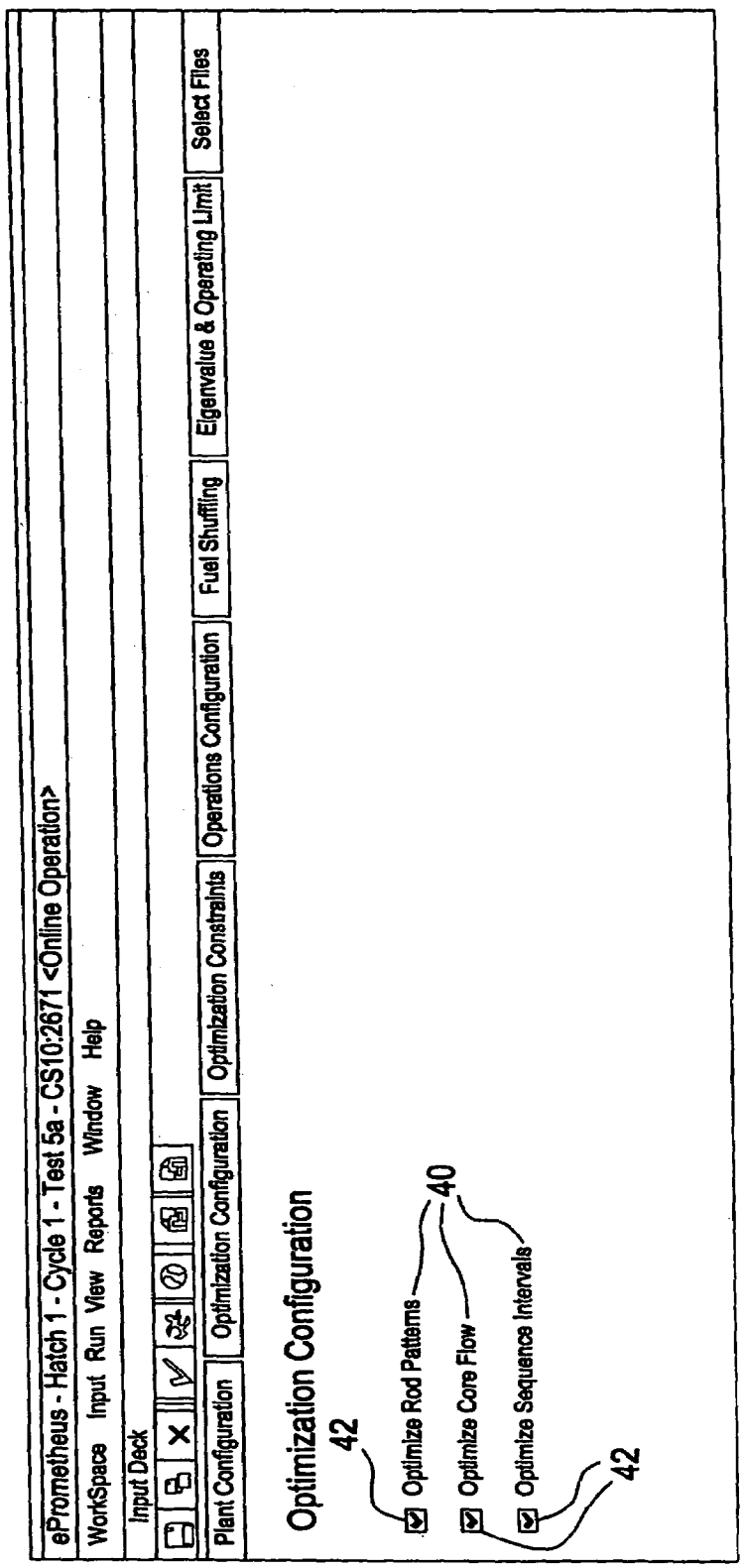
FIG. 11 illustrates a screen shot of an optimization configuration page used in selecting one or more optimization parameters associated with the optimization problem of boiling water reactor core design according to an embodiment of the present invention.

FIG. 11 illustrates a screen shot of an optimization configuration page used in selecting one or more optimization parameters associated with the optimization problem of boiling water reactor core design according to this embodiment of the present invention. As shown, the optimization parameters 40 of optimize rod patterns, optimize core flow, and optimize sequence intervals are available for selection by the user as optimization parameters. As is known, control blade (sometimes also referred to as control rods) positions affect the local power as well as the nuclear reaction rate within the fuel bundles. Optimize rod patterns means making an optimal determination of individual control rod or blade positions and rates of movement within a control blade grouping, for the duration of time during the operating cycle when a given sequence is being used to control the reactor. Sequences are time intervals during the reactor's cycle of operation. Generally, sequences may be a period of approximately 120 days, but the duration of sequences may be any period less than or equal to the nuclear reactor's cycle of operation.

Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence is used to control the reactor during the operating cycle. Sequence intervals affect local power as well as the nuclear reaction rate.

Using the data input device 918, computer 922 or computer 926, each of which includes a display and a computer mouse, the user selects one or more of the optimization parameters by clicking in the selection box 42 associated with an optimization parameter 40. When selected, a check appears in the selection box 42 of the selected optimization parameter. Clicking in the selection box 42 again de-selects the optimization parameter.

Figure 12:
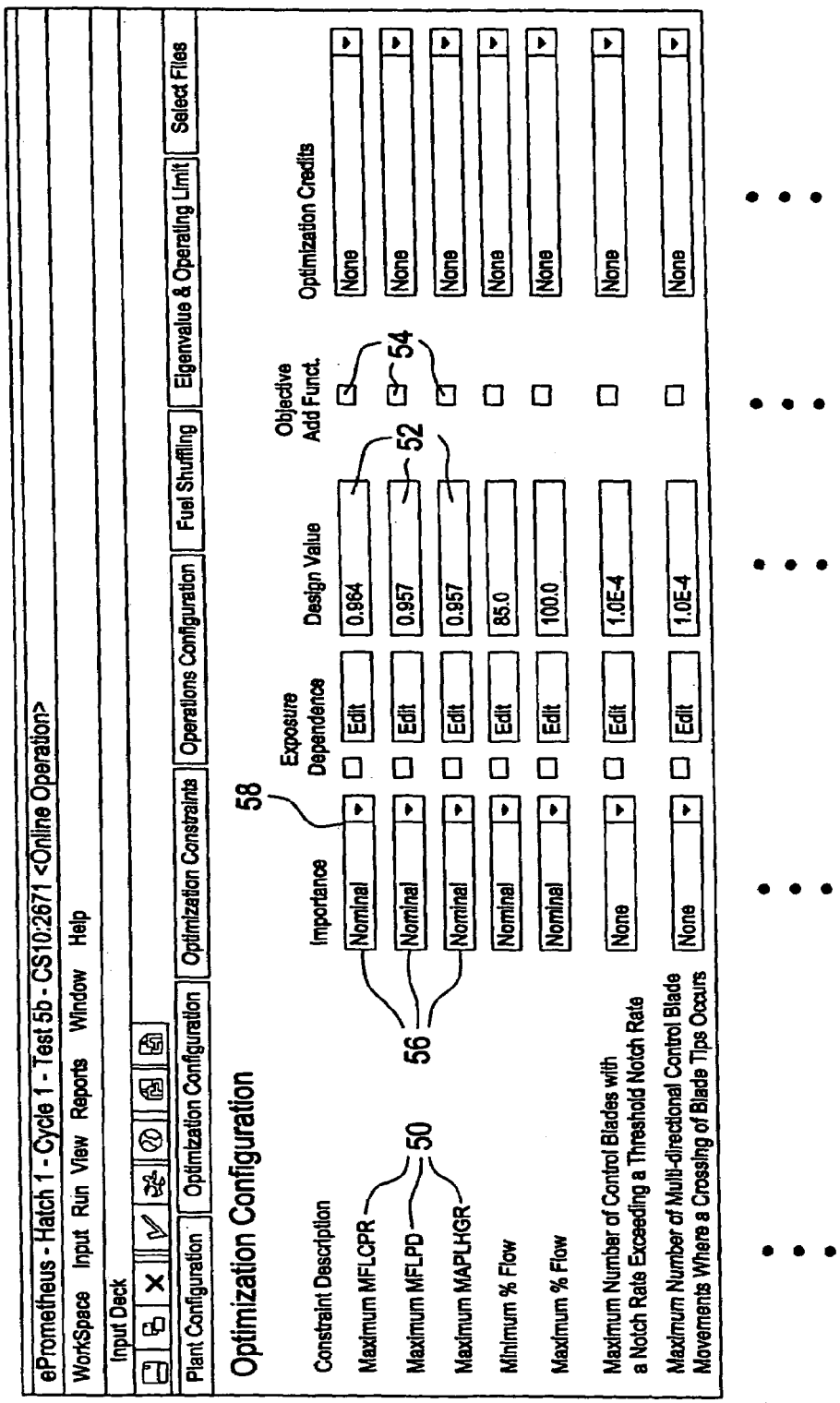
FIG. 12 illustrates a screen shot of an optimization constraints page listing optimization constraints associated with the optimization problem of boiling water reactor core design according to an embodiment of the present invention.

The memory 916 also stores constraint parameters associated with the optimization problem. The constraint parameters are parameters of the optimization problem that must or should satisfy a constraint or constraints. FIG. 12 illustrates a screen shot of an optimization constraints page listing optimization constraints associated with the optimization problem of boiling water reactor core design according to this embodiment of the present invention. As shown, each optimization constraint 50 has a design value 52 associated therewith. Optimization constraints may be below the specified design value if maximum valued or, alternatively, may be above the specified design value if minimum valued. The user has the ability to select optimization parameters for consideration in configuring the objective function. Using the data input device 18, computer 22 or computer 26, each of which includes a display and a computer mouse, the user selects an optimization constraint by clicking in the selection box 54 associated with an optimization constraint 50. When selected, a check appears in the selection box 54 of the selected optimization constraint 50. Clicking in the selection box 54 again de-selects the optimization constraint.

Each optimization parameter has a predetermined credit term and credit weight associated therewith stored in memory 16. Similarly, each optimization constraint has a predetermined penalty term and penalty weight associated therewith stored in memory 16. In the embodiment shown in FIG. 12, the penalty term incorporates the design value, and the user can change (i.e., configure) this value as desired. Additionally, the embodiment of FIG. 3 allows the user to set an importance 56 for each optimization constraint 50. In the importance field 58 for an optimization constraint, the user has pull-down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Additionally, the embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. application Ser. No. 10/246,718, titled METHOD AND APPARATUS FOR ADAPTIVELY DETERMINING WEIGHT FACTORS WITHIN THE CONTEXT OF AN OBJECTIVE FUNCTION, by the inventors of the subject application.

Optimization using the Objective Function

Figure 13:
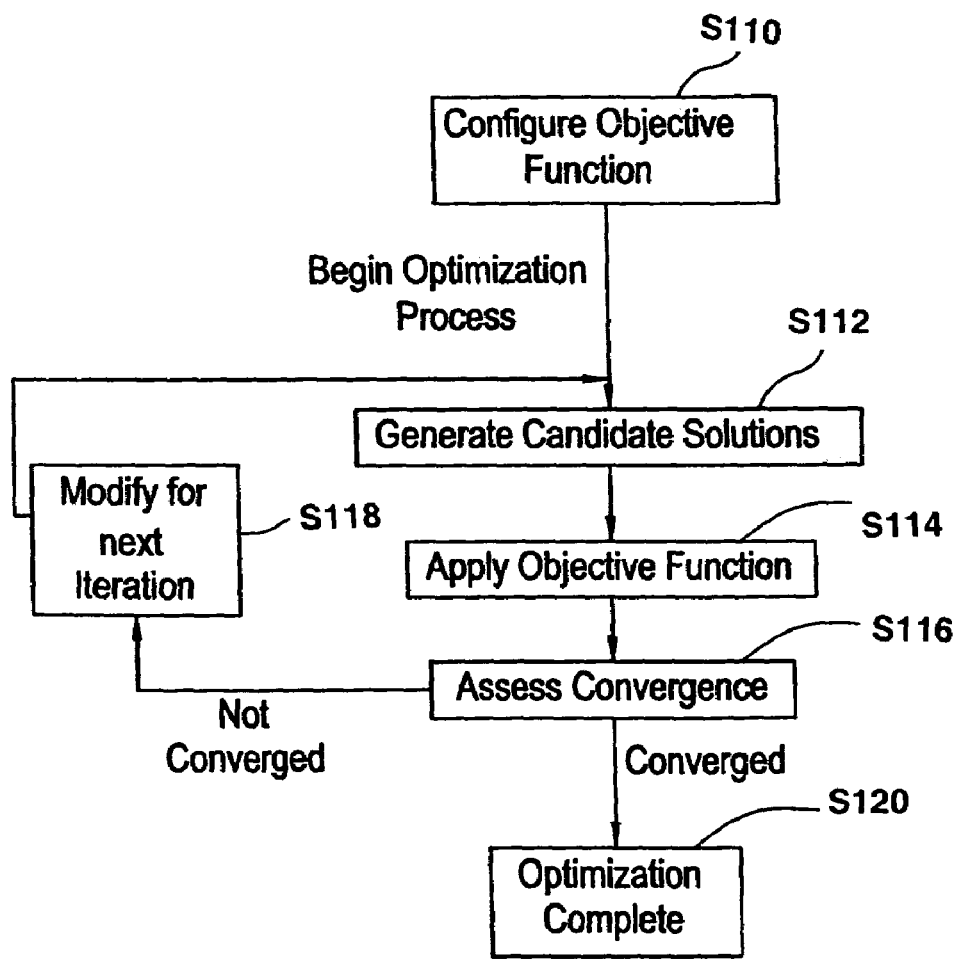
FIG. 13 illustrates a flow chart of an optimization process employing the objective function of the present invention.

FIG. 13 illustrates a flow chart showing one of the many uses for the objective function of the present invention. Specifically, FIG. 13 illustrates a flow chart of an optimization process employing the objective function of the present invention. For the purposes of explanation only, the optimization process of FIG. 13 will be described as being implemented by the architecture illustrated in FIG. 9. As shown, in step S110 the objective function is configured as discussed above in the preceding section, then the optimization process begins. In step S112, the processor 914 retrieves from memory 916 or generates one or more sets of values for input parameters (i.e., system inputs) of the optimization problem based on the optimization algorithm in use. For example, for the optimization problem of boiling water reactor core design, some of the input parameters would be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc. Each input parameter set of values is a candidate solution of the optimization problem. The processor 914 runs a simulated operation and generates a simulation result for each input parameter set of values. For example, for boiling water reactor core design, a well-known simulation program for boiling water reactor operation is run using an input parameter set. The simulation result includes values (i.e., system outputs) for the optimization parameters and optimization constraints. These values, or a subset of these values, are values of the variables in the mathematical expressions of the objective function.

Then, in step S114, the processor 914 uses the objective function and the system outputs to generate an objective function value for each candidate solution. In step S116, the processor 914 assesses whether the optimization process has converged upon a solution using the objective function values generated in step S114. If no convergence is reached, then in step S918, the input parameter sets are modified, the optimization iteration count is increased and processing returns to step S112. The generation, convergence assessment and modification operations of steps S112, S116 and S118 are performed according to any well-known optimization algorithm such as Genetic Algorithms, Simulated Annealing, and Tabu Search. When the optimization problem is boiling water reactor core design, the optimization algorithm can be, for example, as described in detail above with respect to FIGS. 1A-8

The Objective Function as a Tool

Before the advent of fairly successful optimization tools, generating viable solutions to an optimization problem fell on the shoulders of highly experienced individuals, who through years of practice and experience in a particular field, developed a set of skills for generating possible solutions to the optimization problem. Even today such practices continue. However, these individuals still need a reliable method for assessing their solutions. The objective function of the present invention provides such a tool.

Referring again to FIG. 9 for the purposes of explanation only, an individual desiring to apply an objective function according to the present invention accesses the server 910 via input 918, computer 926 or computer 922. The user then configures an objective function as described above; for example, the user accesses a previously stored configured objective function or configures the objective function through data entry. The user then supplies the values for the input variables of the objective function, and receives an objective function result. The user can perform this operation for different candidate solutions to obtain figures of merit regarding the solutions. In this manner, the user treats the objective function as a tool in determining a solution to the optimization problem.

The invention provides a systematic and general method for defining an objective function for Constrained Optimization Problems (COPs), Constraint Satisfaction Problems (CSPs) and Free Optimization Problems (FOPs), independent of the optimization search employed. The invention provides a mechanism within the context of the penalty function approach for addressing: 1) any number of constraints and optimality conditions, 2) different mathematical forms for the credit and penalty terms and 3) any number of dimensions in the candidate solution data and constraints. The invention provides a prescription for encoding objective function definitions within an optimization search through a software data module. Because of the flexibility of the invention, changes in optimality conditions, constraint term definitions, and weight factors are readily accommodated within the calling program simply by changing the data passed to the software data module.

Robustness calculation

The robustness calculation is performed with respect to the operational control variables within a nuclear power plant. Example variables of interest are the control blade notch positions at each exposure step, the core flow at each exposure step, and the control blade sequence exchange times throughout the cycle. It assumes that the placement of the exposed and fresh fuel is fixed.

Control blades are typically grouped and assigned a designation, such as 'A1', 'A2', 'B1', and 'B2'. Only the control blades within a specified group may be used for control of the reactor over a designated period of time. For example, dividing the core into 8 exposure periods (i.e. time periods) of 2 months each, a typical operational strategy might be the ordered use of blades within the following groups—'B1', 'A1', 'B2', 'A2', 'B1', 'A1', 'B2', 'A2'. The time boundaries between any two groups is called a sequence exchange, such as 'B1'->'A1' which occurs at the completion of the first 2 month period. Within a group, individual control blades are placed at notch positions, which correspond to a certain fraction of insertion. Notch 48 corresponds to completely withdrawn while notch 0 corresponds to completely inserted. Symmetric blades may be ganged and will therefore move in unison. Typically symmetries are octant, quadrant (mirror and rotational), and half core rotational.

Control blades are moved to control local power within the reactor core as the fuel depletes as well as to control the reactivity of the core. In conjunction with blades, the core flow may also be used as a control mechanism. The higher the core flow, the more core reactivity and vice-versa. Similarly, the deeper a control blade is inserted the lower the core reactivity and vice-versa. The impact of a given blade on core reactivity and local power depends on a number factors including: 1) the location of the blade—blades near the core periphery in low power regions have less of an impact than those in higher power regions such as near the center, 2) the characteristics of the fuel bundles surrounding the blade (i.e. fresh fuel or highly exposed fuel), 3) the number of symmetric partners (a ganging of 8 blades has greater impact than a ganging of 4 blades), 4) the core exposure, and 5) the current core state power distribution (inserting a blade for an axially bottom-peak power shape, will have greater impact than for a top-peaked power shape).

A reference design is defined by a complete operational description of the reactor and includes the control blade groups, sequence exchange times, notch positions for each blade (and their symmetric partners) within the blade group, and core flow—all as a function of cycle exposure.

The user enters input for the robustness calculation to the GUI 912 via, for example, the input 918. Inputs include the operational variables—rod patterns, core flow, and/or sequence intervals, and the size of the perturbation to be applied to each of the variables in performing the robustness calculation. Examples of perturbations are +/−2 notches for control blade positions, +/−2% for core flow, and +/−50 MWD/sT cycle exposure for sequence exchange times. Alternatively, these perturbations may be entered as a fraction of their maximum range ("Response Surface Width"). For control blades, an input fraction of 0.1 for a range of 0 to 48 notches would yield a perturbation size of +/−4 notches (rounded down). For flow, an input fraction of 0.1 for a range of 90 to 100% flow would yield a perturbation size of +/−1% flow. For a sequence exchange, an input fraction of 0.1 might result in +/−100 MWD/sT for the perturbation size (corresponding to a range of 1000 MWD/sT centered about the reference design cycle exposure). For example, this input may be added to and supplied as part of the Optimization Configuration shown FIG. 11.

Once the control variable types and their respective perturbation sizes have been set, the robustness calculation is performed. For each operational variable, two simulations are performed utilizing simulation input files for which the operational variable has been perturbed—once positively and once negatively with respect to the reference design value. For example, a control blade at notch position 16 would be perturbed in the first simulation to notch 18 and in the second simulation to notch 14. For variables at the end of their range, the two perturbations will occur either below or above the range end value. For example, a control blade at notch position 0 would be perturbed to notches 2 and 4, respectively. As will be appreciated, these simulations may be performed by predicted reactor core simulation as discussed above. It will further be understood, that the response surface generated as discussed in detail above may also already include these simulations or predicted simulations.

Each simulation produces a complete set of simulation output parameters that can be compared to their unperturbed reference design values. Reactivity and thermal outputs are then assessed for their change as impacted by the perturbation. The complete set of perturbations in each of the operational variables becomes part of the response surface or a portion of the response surface of interest.

An evaluation of robustness for a given reference design will produce a series of output edits and graphics visualization that allow the user to easily identify those perturbation variables that have the highest degree of impact on the core output variables. FIG. 14A illustrates an example of the output edits displayed by the GUI 912. FIG. 14A displays an excerpt from the results of a robustness calculation. The "BLADE POSITION INDEPENDENT VARIABLES" heading provides a list of the control blade independent variables by their variable number "Ivar" (a sequential numbering scheme within the software), the "Blade Group Name" (a user-designated character string defining the blade group to which an individual blade belongs), the exposure step "Exp.", the x-y coordinate location "Location" of the control blade, a symmetry designation "Symm" that identifies the number of ganged partners for the particular blade (in this case "P" means the blade is part of a pair), and the reference position "Ref Pos" in terms of number of notches.

For example, as shown in FIG. 14A, the Blade Position Independent Variables include Ivar values 25, 26 and 27, and each blade represented by these Ivar values is the same blade as evidence by the same Blade Group Name of "A2_G10_INT" and Location of 15, 11. The difference between the independent or control variables is scene in the respective Exposures of 9, 10 and 11; wherein the blade is at different positions shown by Ref. Pos. of 0, 8 and 10, respectively.

In FIG. 14A, the "FLOW INDEPENDENT VARIABLES" heading provides a list of the flow independent or control variables by their variable number "Ivar", exposure value "Exposure", the minimum "Min" and maximum "Max" flow range values, and the flow reference value "Ref.". For example, FIG. 14A shows an Ivar value of 28, an Exposure of 0, a Minimum flow range of 90.20, a Maximum flow range of 92.66 and a Reference flow of 90.20. Similar outputs for the sequence exchange independent variables are readily obtained.

In FIG. 14A, the "ROBUSTNESS CALCULATIONAL SUMMARY" provides the response surface perturbation results for each of the control variables (e.g., control blade and flow variables) described above. "Var" is the variable number consistent with the "Ivar" designations described previously. "Reference" corresponds to "Ref Pos" for the control blade independent variable or "Ref." for the flow independent variables. The perturbed value of the independent variable "Perturbed" shows the new value of the independent variable achieved by varying the control blade or flow about its reference value. As shown, for each independent or control variable there are 2 perturbed cases within the list, consistent with the response surface predictor model. The remaining columns display data indicating constraint information such as the core limiting values for each of the important thermal limits, MAPRAT, MFLPD, and MFLCPR along with the corresponding core coordinates and exposure steps, and the maximum change in core reactivity "Dk" along with the corresponding exposure step. Within the columns "i" corresponds to an x-coordinate, "j" corresponds to a y-coordinate, and "k" corresponds to a z-coordinate as is standard practice. The designation "exp" is an exposure step value corresponding to a point in time during the cycle. "Maprat" and "Mflpd", being calculated from three-dimensional information as a function of exposure, show "i", "j", "k" and "exp" while "Mflcpr", being calculated from two-dimensional information as a function of exposure, shows "i", "j" and "exp". These calculations are well-known in the art and will not be described in detail for the sake of brevity.

Each entry in the calculational summary derives from a simulator case in which a given independent variable is perturbed about its reference value. As such, detailed three-dimensional, two-dimensional and scalar data is available as a function of exposure for each of the relevant core thermal and reactivity outputs. For three-dimensional data, such as MAPRAT and MFLPD, the standard graphical view is of a given core plane at a given exposure step with the ability to "scroll" through the various axial elevations as well as the various exposure steps. Changes to the core outputs of the perturbed case with respect to the reference case are displayed in the two-dimensional map with color coding to highlight the greatest changes in the core as well as the most limiting value for the core that results from the perturbation. Similar views exist for the two-dimensional data, such as MFLCPR, with the elimination of the axial elevation but the ability to "scroll" through exposure steps. Scalar data, such as HOTX, may be view as a scalar versus exposure, displaying the change in perturbed value versus the reference.

Figure 14B:
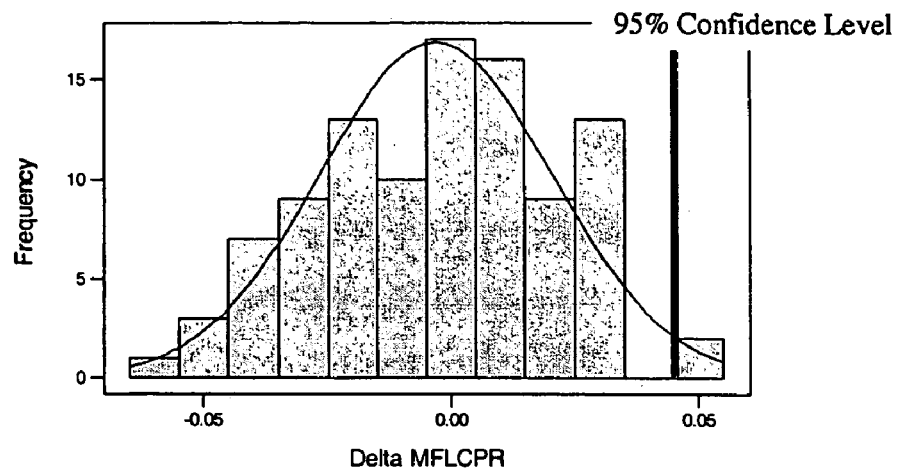
FIG. 14B illustrates an example graphical presentation with statistical analysis of for output edits.
Figure 15:
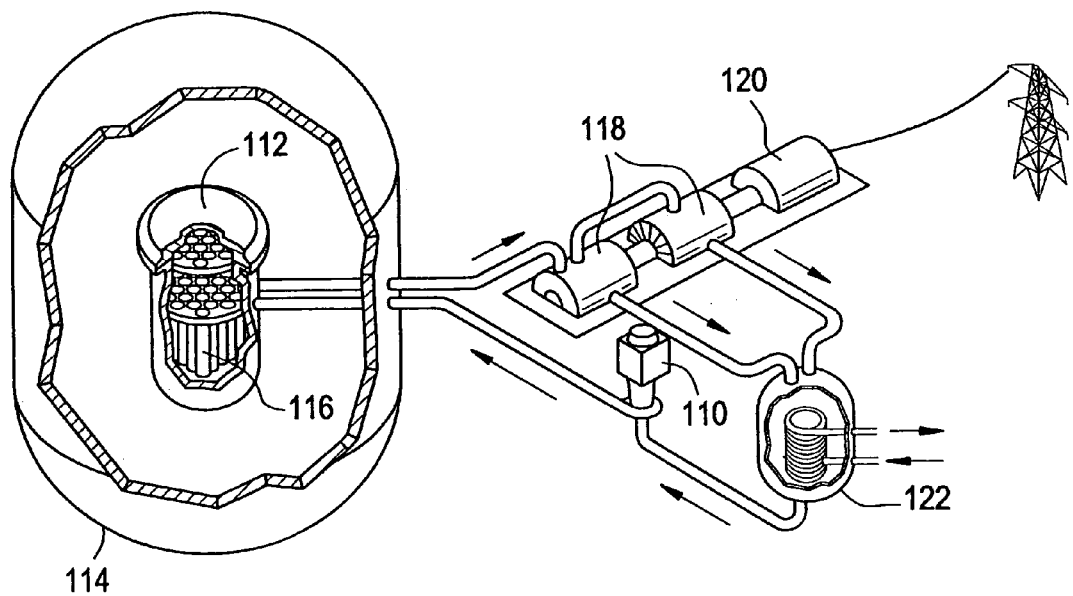
FIG. 15 illustrates a conventional boiler water reactor.
Figure 16:
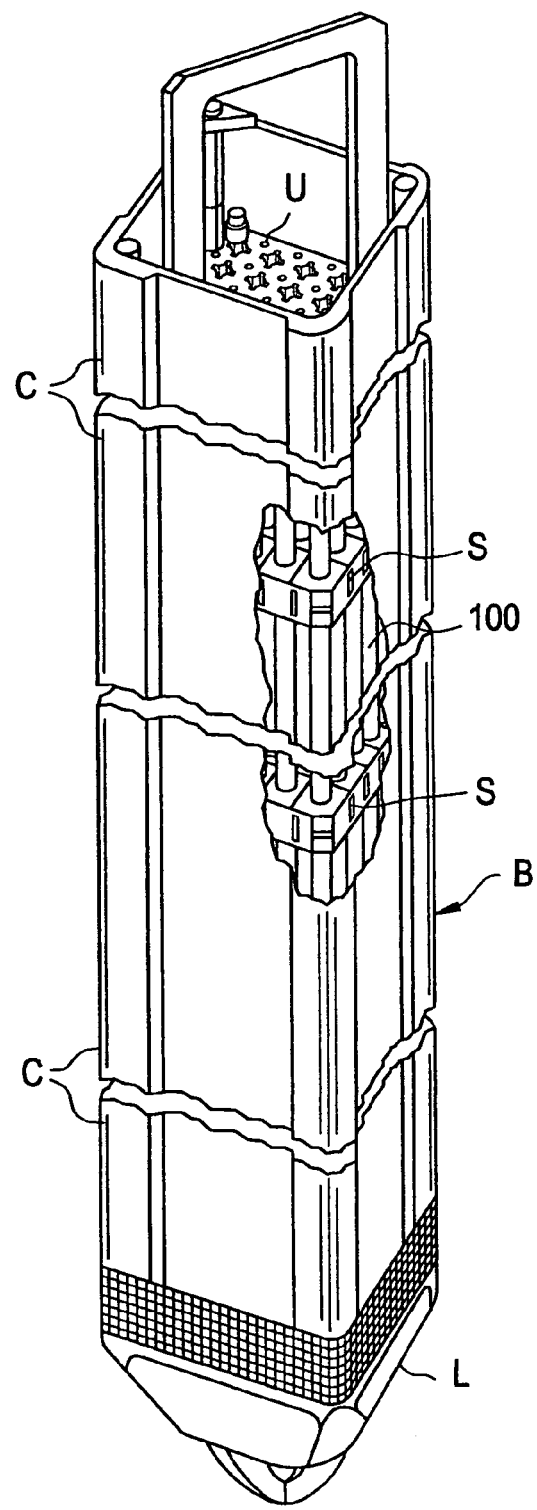
FIG. 16 illustrates a fuel bundle in the core of the reactor vessel illustrated in FIG. 15.
Figure 17:
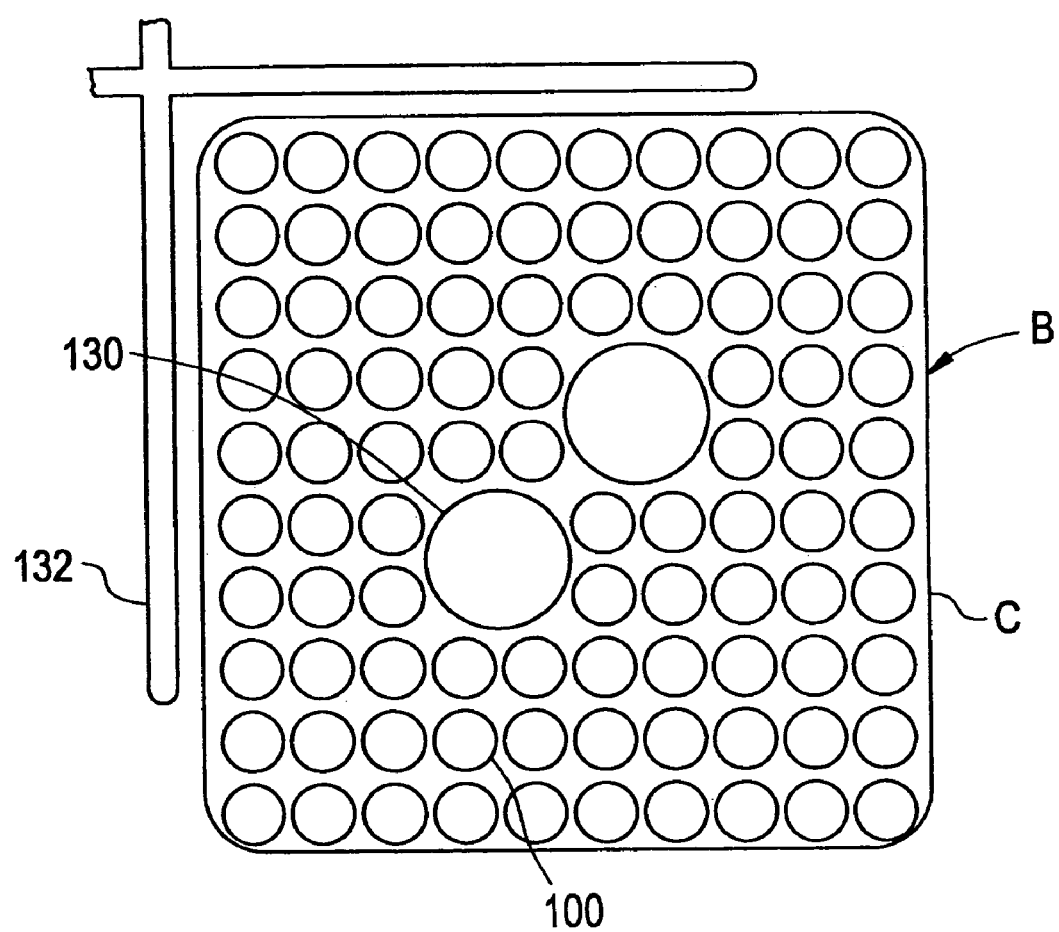
FIG. 17 is a schematic representation of a cross-section or lattice of the nuclear fuel bundle illustrated in FIG. 16.

The composite results from the calculational summary may also be displayed in a graphical summary on the GUI 912. For example, a frequency distribution for the change in the values for "Maprat", "Mflpd", "Mflcpr", and "Dk" may be displayed along with statistical indicators such as confidence interval for the mean and median. FIG. 14B shows an example output for the change in MFLCPR for the set of independent variables.

For the data shown as output edits or as graphical visualizations, statistical information may also be presented. For example, in FIG. 14B, the 95% confidence level (i.e. 95% of the data is bounded) equal to 0.04 is shown. The higher the value for the 95% confidence level, the less robust a given design would be concluded to be.

From studying the presented information, the designer may then make modifications to the design, focusing on reducing the impact of those high impact variables. Such modifications may include fuel shuffles, fresh bundle design changes, and/or operational strategy changes (control blades and flow).

As will be appreciated, flow and blade position are two example independent variables, and designing an operation strategy of a nuclear reactor may include other independent variables, other types of output edit data, and other statistical analysis. Furthermore, a nuclear reactor has been used only for the purposes of providing an example constraint problem. It will be understood that the concepts of the present invention are applicable to any constraint problem. Therefore, the independent variables, the output data or output edits and the statistical analysis performed will depend on the nature of the constraint problem to which the methods of the prevent invention are applied. For example, feedwater temperature is a potential control variable for an ESBWR design. As is known, the feedwater flow replaces the steam flow leaving the reactor (to spin the turbine) in a BWR and mixes with the "separated water" that is recirculated back through the core. As is known, separators are basically pipes above the fuel that have vanes inside that spin the wet steam, sending the liquid out and sending the dry steam onward. The liquid drops back down through the outside of the vessel and gets pumped downward so that it may re-enter through the bottom of the fuel. The feedwater flow, or make-up flow, comes in at a lower temperature so that the water entering the bottom of the fuel is below the saturation point (i.e. a bit away from producing steam). By changing the feedwater temperature, you can change how soon or later the water begins to boil, impacting the nuclear feedback and power shape within the reactor (voiding is negative feedback meaning it will tend to reduce the reactivity much like a control blade, lack of void is positive feedback).

Use of Robustness Calculation in Objective Function

The response surface produces a transfer function for the change in each output parameter $y_i$ with respect to a change in each control variable $x_j$ (i.e. the two perturbed simulation cases for a given control variable yield this solution). This may be expressed as:

$$\Delta y_i = \frac{\partial y_i}{\partial x_j}\bigg|_0 (x_j - x_o) + \frac{1}{2}\frac{\partial^2 y_i}{\partial x_j^2}\bigg|_0 (x_j - x_o)^2 \quad (2)$$

where the coefficients (i.e. derivatives) are evaluated at the reference design conditions expressed by $x_o$.

Examining equation (2), the first term on the right hand side is linear in the size of the control variable perturbation. The second term on the right hand side is non-linear and represents the curvature of $\Delta y_i$ with respect to the control variable perturbation. From the perspective of operational control, it is desirable to avoid configurations where the curvature (i.e. second derivative) described by Eq. 1 is large.

An example embodiment addresses optimization for robustness by incorporating the output variable perturbation within the context of the objective function of equation (1). Accordingly, an objective function may be modified or configured as described above to incorporate robustness terms.

The response surface second derivatives, $$\frac{\partial^2 y_i}{\partial x_j^2}\bigg|_0$$

shown in equation (2), may be treated within the context of a credit and penalty term of equation (1). Because the second derivatives may be positive or negative, we define the term, $V_{i,j}$, which is the absolute value of the response surface second derivative. With this definition, the credit and penalty are given as:

$$C_n = \begin{cases} -\lambda_n^{credit} \min(V_{i,j}^{max} - V_{i,j}) & \text{if all } V_{i,j} \leq V_{i,j}^{max} \\ 0 & \text{otherwise} \end{cases} \quad (3)$$

$$P_n = \begin{cases} \lambda_n^{penalty} \sum_{i,j} (V_{i,j} - V_{i,j}^{max}) & \text{for } V_{i,j} \geq V_{i,j}^{max} \\ 0 & \text{otherwise} \end{cases} \quad (4)$$

In equation (4) above, a violation of the maximum value for the second derivative for a given response $y_i$ with respect to a given control variable $x_j$ contributes to the penalty for the objective function. All such violations are summed for each i and j. If a particular second derivative is less than the maximum value, it does not contribute to the penalty violation.

To receive a credit in the objective function, all values for the second derivative must be less than the maximum value allowed. In this case, the second derivative with the least margin to its limiting value will contribute to the credit.

Inputs required for the objective function such as the penalty and credit weight factors and maximum value for the derivatives may be input a variety ways: 1) use of the GUI 912 that allows the user to input values, 2) retrieval from a database or memory 916 of stored values determined from parametric studies, 3) a combination of 1) and 2).

Use of the Objective Function

The objective function may be used as a single composite indicator to assess the robustness of a given design. Positive values of the objective function indicate that violations in the magnitudes of the second derivative exist for the design. Values of zero for the objective function indicate that all violations have been satisfied while values less than zero indicate that margin exists. The smaller the value of the objective function the more robust the design.

The penalty and credit components for robustness may be combined with other core design penalty and credit components to determine an overall objective function. The objective function may be used as part of the GUI 912 in order to aid the designer in making modifications to the design. The designer's goal in such case is to minimize the value of the objective function. The objective function may be combined with the previously described edits showing the variables of highest impact on robustness.

Alternatively, the objective function may be incorporated as part of a formal optimization search algorithm, such as described above with respect to FIG. 13, a steepest descent or genetic algorithm in which tens of thousands of solutions are each evaluated for their robustness.

The technical effect of the invention is a computer system that provides for generating robustness information regarding a propose solution and/or develops a proposed solution that accounts for the robustness of the solution.

The invention being thus described, it will be obvious that the same may be-varied in many ways. For instance, while the present invention has been described as applied to a boiling water reactor design, the present invention is equally applicable to pressure water reactors or other constraint problems. Such variations are not to be regarded as a departure from the spirit and scope of the invention, and all such modifications as would be obvious to one skilled in the art are intended to be included within the scope of the following claims.

We claim:

1. A method of evaluating robustness of a proposed solution to a constraint problem, comprising:
   generating operational output data for at least first and second modified versions of the proposed solution, the first modified version having at least one control variable of the proposed solution perturbed in a first direction and the second modified version having the at least one control variable of the proposed solution perturbed in a second direction, the operational output data being generated by a computer-implemented simulation of a system containing the constraint problem, the at least one control variable being an input parameter for the computer-implemented simulation; and
   presenting at least a portion of the generated operation output data.

2. The method of claim 1, wherein the second direction is opposite to the first direction.

3. The method of claim 1, wherein the constraint problem is one of core design and operational strategy for a nuclear reactor.

4. The method of claim 3, wherein the at least one control variable is a control blade position for at least one control blade at at least one exposure.

5. The method of claim 3, wherein the at least one control variable is core flow.

6. The method of claim 3, wherein the at least one control variable is one of a control blade at one or several successive exposure steps, a set of ganged control blades at one or several successive exposure steps, core flow at one or several successive exposure steps, sequence exchange corresponding to a given exposure step, and feedwater temperature at one or several exposure steps.

7. The method of claim 3, wherein the presenting step presents data indicating at least the control variable perturbed in the first direction, the control variable perturbed in the second direction, at least a portion of the generated operational output data associated with the control variable perturbed in the first direction and at least a portion of the generated operational output data associated with the control variable perturbed in the second direction.

8. The method of claim 7, wherein the presenting step presents data indicating constraint information associated with the control variable perturbed in the first direction and constraint information associated with the control variable perturbed in the second direction.

9. The method of claim 8, wherein the presenting step presents at least a portion of the data graphically.

10. The method of claim 9, wherein the presenting step presents the data indicating constraint information graphically.

11. The method of claim 8, wherein the presenting step presents data indicating a statistical analysis of at least a portion of the data.

12. A method of evaluating a proposed solution for robustness, comprising:
    configuring an objective function to include at least one term accounting for robustness;
    receiving input variable values for the objective function; and
    generating a figure of merit for the proposed solution based on the configured objective function and the received input variable values.

13. A method of generating a solution to an optimization problem, comprising:
    generating at least one candidate solution;
    generating an objective function value using a configured objective function, the configured objective function including at least one term accounting for robustness; and
    assessing convergence of a solution based on the objective function value.

14. A method for operating a system, comprising:
    implementing a solution derived using an objective function that includes at least one term accounting for robustness.

15. An apparatus for evaluating robustness of a proposed solution to a constraint problem, comprising:
    a processor generating operational output data for at least first and second modified versions of the proposed solution, the first modified version having at least one control variable of the proposed solution perturbed in a first direction and the second modified version having the at least one control variable of the proposed solution perturbed in a second direction, the operational output data being generated by a computer-implemented simulation of a system containing the constraint problem, the at least one control variable being an input parameter for the computer-implemented simulation; and a user interface presenting at least a portion of the generated operation output data.

* * * * *